(12) United States Patent
Takizawa et al.

(10) Patent No.: US 6,573,964 B1
(45) Date of Patent: Jun. 3, 2003

(54) MULTIDOMAIN VERTICALLY ALIGNED LIQUID CRYSTAL DISPLAY DEVICE

(75) Inventors: Hideaki Takizawa, Kawasaki (JP); Satoru Kawai, Yonago (JP); Tsuyoshi Kamada, Yonago (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/472,328

(22) Filed: Dec. 23, 1999

(30) Foreign Application Priority Data

Dec. 25, 1998 (JP) .......................................... 10-371420
Dec. 28, 1998 (JP) .......................................... 10-373058

(51) Int. Cl.[7] .......................................... H02F 1/1336
(52) U.S. Cl. ...................................... 349/129; 349/138
(58) Field of Search ................................ 349/138, 129

(56) References Cited

U.S. PATENT DOCUMENTS 5,953,093 A * 9/1999 Hirata et al. ................ 349/143
6,313,899 B1 * 11/2001 Wu et al. .................... 349/130
6,356,335 B1 * 3/2002 Kim et al. ................... 349/156
6,400,440 B1 * 6/2002 Colgan et al. .............. 349/160

* cited by examiner

*Primary Examiner*—James Dudek
(74) *Attorney, Agent, or Firm*—Greer, Burns & Crain, Ltd.

(57) ABSTRACT

A pair of substrates is disposed in parallel at a gap distance therebetween. Liquid crystal material containing liquid crystal molecules having negative dielectric anisotropy is filled in between the substrates. The liquid crystal molecules are homeotropically aligned. On the opposing surface of one of the substrates, pixel electrodes are disposed in a matrix form and data bus lines and gate bus lines are disposed. The gate bus line passes an inner area of each pixel electrode. Switching elements are formed on the opposing surface of the substrate. Each switching element is controlled by the gate bus line at another row. Protrusions are formed on the opposing surface of one of the substrates. The protrusions divide an area of the pixel electrode into a plurality of areas and each is bent on the gate bus line. A domain border regulating unit is formed on the opposing surface of the other of the substrates. The protrusions and domain border regulating unit define the borders of each domain.

18 Claims, 27 Drawing Sheets

MULTIDOMAIN VERTICALLY ALIGNED LIQUID CRYSTAL DISPLAY DEVICE

This application is based on Japanese Patent Applications HEI No. 10-371420 filed on Dec. 25, 1999 and HEI No. 10-373058 filed on Dec. 28, 1999, the entire contents of which are incorporated herein by reference.

BACKGROUND OF THE INVENTION a) Field of the Invention

The present invention relates to a liquid crystal display device, and more particularly to a liquid crystal display device wherein liquid crystal molecules are vertically aligned (homeotropic alignment) between opposing substrates when no electric field is applied and one pixel is divided into a plurality of domains.

b) Description of the Related Art

FIGS. 25A to 25C are schematic cross sectional views of a conventional liquid crystal display device of a homeotropic alignment type, respectively illustrating a black display state, a halftone display state, and a white display state. Liquid crystal material containing liquid crystal molecules having a negative dielectric anisotropy is filled in between a pair of substrates 100 and 101. Polarizer plates are disposed outside of the substrates 100 and 101, with their polarizing axes crossing at a right angle.

As shown in FIG. 25A, when a voltage is not applied, the liquid crystal molecules 102 are aligned vertically relative to the substrates 100 and 101 and produce black color. As a voltage is applied across the substrates to align the liquid crystal molecules 102 in parallel to the substrates as shown in FIG. 25C, the polarization direction of light passing through the liquid crystal layer rotates and white color is produced.

As shown in FIG. 25B, as a voltage is applied which is lower than that when the white image is produced, the liquid crystal molecules 102 are aligned obliquely relative to the substrate. A halftone image is obtained by light L1 propagating along a direction perpendicular to the substrates. Light propagating from the lower right to upper left as viewed in FIG. 25B rarely receives the birefringence effect of the liquid crystal layer. Therefore, when the display screen is viewed from the upper left, it becomes black. Contrary, light propagating from the lower left to upper right as viewed in FIG. 25B considerably receives the birefringence effect of the liquid crystal layer. Therefore, when the display screen is viewed from the upper right, it becomes white. As above, a homeotropic type liquid crystal display device is generally has poor visual angle characteristics in the halftone display state.

The visual angle characteristics of a conventional homeotropic type liquid crystal are poor in the halftone display state, as described above.

SUMMARY OF THE INVENTION

It is an object of the present invention to provide a homeotropic type liquid crystal display device having improved visual angle characteristics.

According to one aspect of the present invention, there is provided a liquid crystal display device, comprising: first and second substrates disposed in parallel at a gap therebetween; liquid crystal material containing liquid crystal molecules having negative dielectric anisotropy, said liquid crystal material being filled in the gap between said first and second substrates; alignment film for homeotropically aligning the liquid crystal molecules in a state of no electric field; pixel electrodes formed on an opposing surface of said first substrate and regularly disposed in row and column directions; a common electrode formed on an opposing surface of said second substrate; data bus lines disposed on the opposing surface of said first substrate, each data bus line being provided in correspondence with each column of said pixel electrodes; gate bus lines disposed on the opposing surface of said first substrate, each gate bus line being provided in correspondence with each row of said pixel electrodes, said gate bus line being disposed passing an inside area of said pixel electrode at a corresponding row, as viewed along a substrate normal direction; switching elements disposed on the opposing surface of said first substrate, each switching element being provided in correspondence with each pixel electrode, each switching element connecting a corresponding pixel electrode and a corresponding data bus line and being switched between a conduction state and a non-conduction state in response to an externally applied control signal; gate connection lines, each gate connection line being provided for each switching element, each gate connection line transferring the control signal from the gate bus line, corresponding to a row different from a row of the pixel electrode connected to corresponding switching element, to corresponding switching element; protrusions formed on the opposing surface of one of said first and second substrates, said protrusions dividing an area of said pixel electrode into a plurality of areas and each protrusion being bent at a point where the protrusion intersects with the gate bus line as viewed along the substrate normal direction; and domain border regulating structure formed on the opposing surface of the other of said first and second substrates, said domain border regulating structure being disposed at a distance from each of said protrusions as viewed along the substrate normal direction, said domain border regulating structure defining, together with said protrusions, borders of each domain in which a tilt direction of the liquid crystal molecules is uniform when a voltage is applied across said pixel electrode and said common electrode.

The protrusion and domain border regulating structure divide an area of each pixel into a plurality of domains. In each domain, the tilt direction of liquid crystal molecules is uniform when a voltage is applied. Since a plurality of domains having various tilt directions are formed, the visual angle characteristics can be improved. The gate bus line prevents leak light to be caused by disturbed alignment of liquid crystal molecules near the flection point of the protrusion. Further, since auxiliary capacitance is formed between the gate bus line and pixel electrode, a voltage fluctuation of the pixel electrode to be caused by a voltage change of the data bus line can be suppressed.

DETAILED DESCRIPTION OF THE PREFERRED EMBODIMENTS

Prior to describing embodiments of the present invention, a homeotropic type (in this specification, it is called a vertically aligned (VA) type hereinafter) liquid crystal display device proposed by the present inventors in JP-A-HEI-9-230991 will be described.

Figure 26:
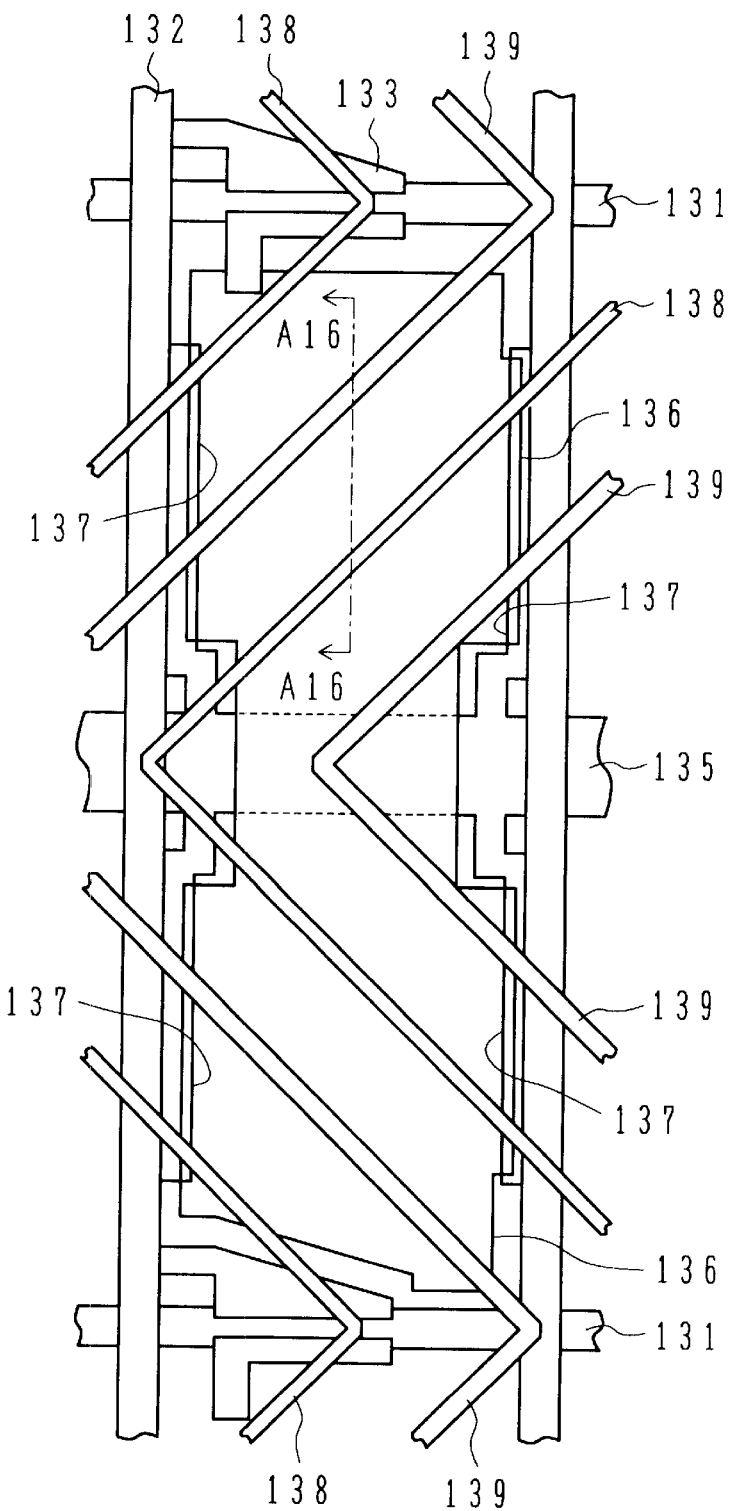
FIG. 26 is a plan view of a liquid crystal display device previously proposed by the present inventors.

FIG. 26 is a plan view showing one pixel of a VA type liquid crystal display device proposed previously by the present inventors. A plurality of gate bus lines 131 extend in a row direction (lateral direction as viewed in FIG. 26). Between two adjacent gate bus lines 131, a capacitance bus line 135 extends in the row direction. An insulating film covers the gate bus lines 131 and capacitance bus lines 135. On this insulating film, a plurality of data bus lines 132 are disposed in the column direction (vertical direction as viewed in FIG. 26).

A thin film transistor (TFT) 133 is formed at the position corresponding to the cross point between the gate bus line 131 and data bus line 132. The drain region of TFT 133 is connected to the corresponding data bus line 132. The gate bus line 131 serves also as the gate electrode of TFT 133.

An interlayer insulating film covers the data bus lines 132 and TFT 133. In an area surrounded by two gate bus lines 131 and two data bus lines 132, a pixel electrode 136 is disposed. The pixel electrode 136 is connected to the source region of a corresponding TFT 133.

An auxiliary capacitance branch 137 branched from the capacitance bus line 135 extends along the side of the pixel electrode 136. The capacitance bus line 135 and auxiliary capacitance branch 137 form an auxiliary capacitance between the lines and the pixel electrode 136. The capacitance bus line 135 is fixed to a predetermined potential.

As the potential of the data bus line 132 fluctuates, the potential of the pixel electrode 136 is changed through coupling of parasitic capacitance. With the structure shown in FIG. 26, since the pixel electrode 136 is connected via the auxiliary capacitance line to the capacitance bus line 135, the potential change of the pixel electrode 136 can be suppressed.

First and second protrusions 138 and 139 extend in a zigzag way along the column direction on the opposing surfaces of the TFT substrate and opposing substrate, respectively. The first protrusions 138 are disposed at an equal pitch in the row direction, and their flection points are positioned at the cross points between the protrusions and the gate bus lines 131 and auxiliary bus lines 135. The second protrusions 139 are formed in a zigzag way along the column direction on the opposing surface of the opposing substrate. The second protrusions 139 have the pattern similar to that of the first protrusions 138 and disposed approximately at the center of two adjacent first protrusions 138.

Figure 27A:
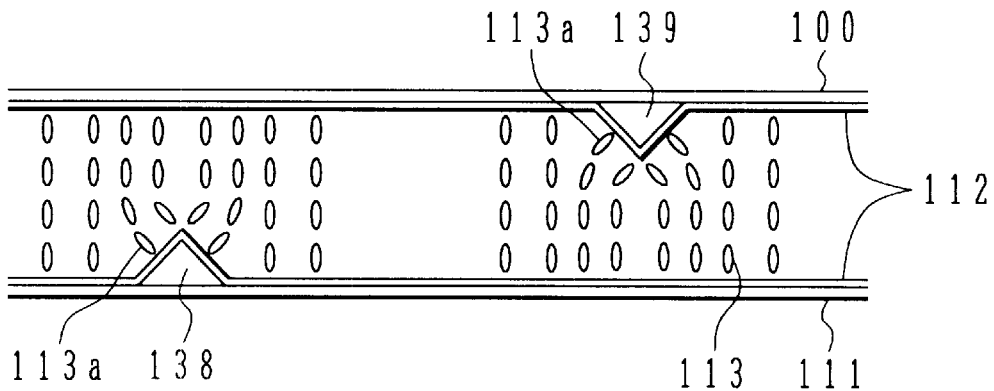
FIGS. 27A and 27B are cross sectional views of the liquid crystal display device shown in FIG. 26.

FIG. 27A is a cross sectional view taken along one-dot chain line A16—A16 shown in FIG. 26. The first protrusion 138 is formed on the opposing surface of the TFT substrate 111, and the second protrusion 139 is formed on the opposing surface of the opposing substrate 110. Vertical alignment films 112 are formed on the opposing surfaces of the TFT substrate 111 and opposing substrate 110, covering the protrusions 138 and 139. Liquid crystal material containing liquid crystal molecules 113 is filled in between the TFT substrate 111 and opposing substrate 110. The liquid crystal molecules 113 have negative dielectric anisotropy.

When a voltage is not applied, the liquid crystal molecules 113 are aligned vertically relative to the substrate surface. The liquid crystal molecules 113a on the slanted surfaces of the first and second protrusions 138 and 139 tend to be aligned vertically relative to the slanted surfaces. Therefore, the liquid crystal molecules 113a on the slanted surfaces of the first and second protrusions 138 and 139 are aligned obliquely relative to the substrate surface. However, since the liquid crystal molecules 113 are aligned vertically in most of the pixel area, a good black display state can be obtained.

Figure 27B:
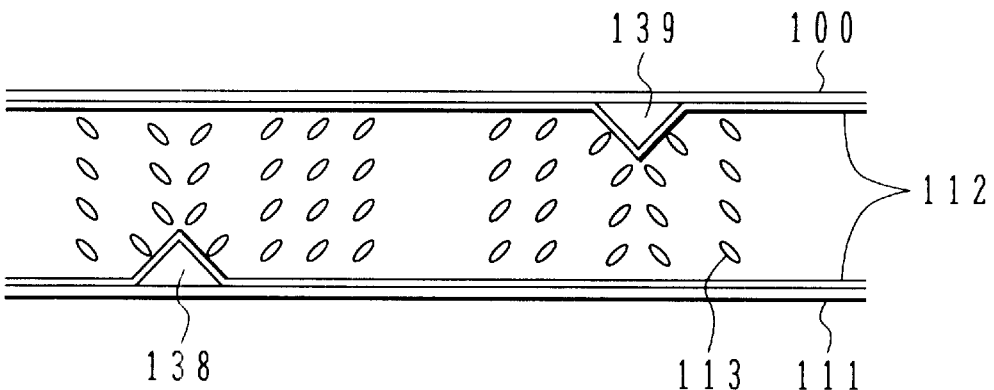

FIG. 27B is a cross sectional view when a voltage is applied to make the liquid crystal molecules 113 be slanted. The liquid crystal molecules 113a already slanted as shown in FIG. 27A are slanted further in this slant direction. Liquid crystal molecules 113 near the molecules 113a are affected by the molecules 113a and slanted in the same slant direction. The longitudinal axis (director) of each of the liquid crystal molecules 113 between the first and second protrusions 138 and 139 is therefore aligned along a straight line extending from the lower left to upper right in FIG. 27B. The director of each of the liquid crystal molecules 113 on the left side of the first protrusion 138 and on the right side of the second protrusion 139 is aligned along a straight line extending from the lower right to upper left in FIG. 27B.

A plurality of domains having the same slant direction of liquid crystal molecules are therefore defined in one pixel. The first and second protrusions 138 and 139 define the borders of domains. By disposing the first and second protrusions 138 and 139 in parallel in the substrate plane, two types of domains can be formed. The first and second protrusions 138 and 139 shown in FIG. 26 are flexed so that four types of domains are formed. By forming a plurality of domains in one pixel, the visual angle characteristics of the half tone display state can be improved.

In order to improve the visual angle characteristics, it is preferable to make four types of domains have the same size. By disposing each flection point of the first and second protrusions 138 and 139 generally at the center of each pixel in the column direction, each domain can have approximately the same size.

The inner area near the flection point is not sandwiched between two protrusions. Therefore, the alignment of the liquid crystal molecules in this area is likely to be disturbed. A disturbed alignment of liquid crystal molecules may cause leak light and degrade the display quality. The liquid crystal display device shown in FIG. 26 prevents generation of leak light by shielding the area near the flection point with the capacitance bus line 135.

As shown in FIG. 26, the gate bus line 131 passes between pixels in the column direction and the capacitance bus line 135 passes generally the center of each pixel. Therefore, the aperture efficiency of the liquid crystal display device shown in FIG. 26 is lower than that of a liquid crystal display device whose pixel is not divided into a plurality of domains. The embodiments of the invention to be described below prevent the aperture efficiency from being lowered.

Figure 1:
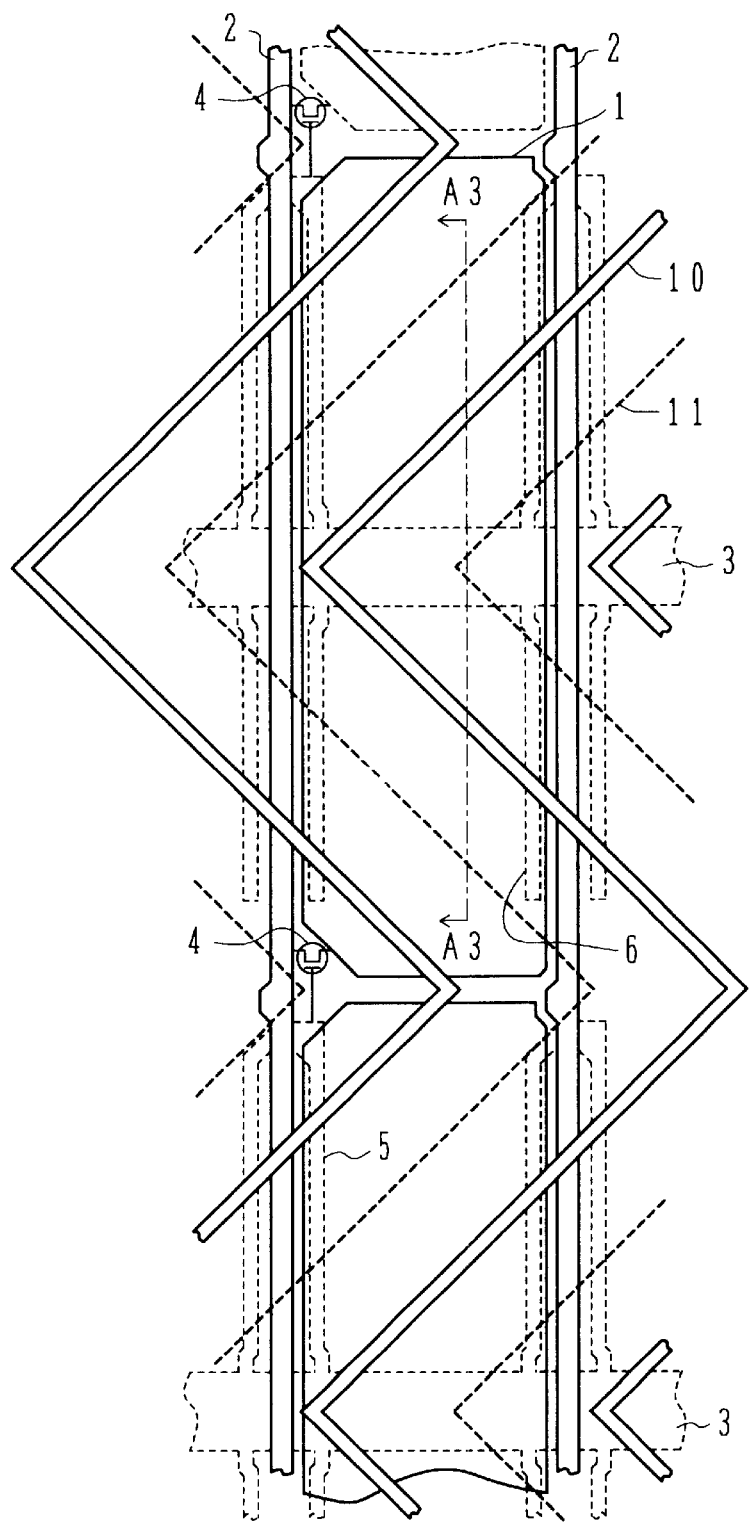
FIG. 1 is a plan view of a liquid crystal display device according to a first embodiment of the invention.

FIG. 1 is a plan view of a liquid crystal display device according to the first embodiment of the invention. A plurality of pixel electrodes 1 are disposed regularly in the row and column directions on a TFT substrate. A data bus line 2 is disposed along each column of the pixel electrodes 1. The data bus line 2 extends in the column direction between two pixels adjacent in the row direction. A gate bus line 3 is disposed along each row of the pixel electrodes 1. The gate bus line 3 extends in the pixel electrodes 1 of the corresponding row, and preferably passes generally at the center of each pixel in the column direction, as viewed along the substrate normal direction.

A TFT 4 is disposed for each pixel electrode 1. TFT 4 connects the pixel electrode 1 and corresponding data bus line 2. The gate electrode of TFT 4 is connected via a gate connection line 5 to the gate bus line 3 corresponding to the row adjacent to the row of the pixel electrode 1 connected to TFT 4. A control signal applied to the gate bus line 3 is applied to the gate electrode of TFT 4 via the gate connection line 5. This control signal switches between conduction and non-conduction of TFT 4.

The gate connection line 5 branches from the gate bus line 3 and extends to TFT 4 along the side of the pixel electrode 1 corresponding to the gate bus line 3. In FIG. 1, two gate connection lines 5 disposed on and extending along both sides of the data bus line 2 are connected to the gate electrode of one TFT 4. Instead of two gate connection lines 5, a single gate connection line may be used.

First protrusions 10 are formed on the opposing surface of the TFT substrate. The first protrusions 10 are disposed in a zigzag way in the column direction. The flection angle of the zigzag pattern is 90°, and the period of the zigzag pattern is equal to the pitch of pixels in the column direction. The flection point is positioned between two pixel electrodes 1 adjacent in the column direction and in the gate bus line 3.

Amplitude of the zigzag pattern is about 1.5 times of the pitch of pixels in the row direction. The first protrusions 10 are disposed at an equal pitch in the row direction, and this pitch is equal to the pitch of pixels in the row direction. One of the even and odd number flection points of the zigzag pattern nearly overlaps the data bus line 2 and the other is positioned generally at the center of the pixel electrode in the row direction. The first protrusion 10 divides one pixel electrode area into a plurality of areas.

On the opposing surface of the opposing substrate, second protrusions 11 are formed. The second protrusion 11 has the same zigzag pattern as that of the first protrusion 10, and is disposed at the position shifted by a half pitch of the first protrusion 10 in the row direction.

An area of one pixel electrode is divided into a plurality of domains by the first and second protrusions 10 and 11.

A gate branch 6 branches from the gate bus line and extends along the side of the pixel electrode 1 in the direction opposite to the gate connection line 5. The gate bus line 3, gate connection line 5 and gate branch 6 are directed toward the pixel electrode 1 to form an auxiliary capacitance.

Figure 2:
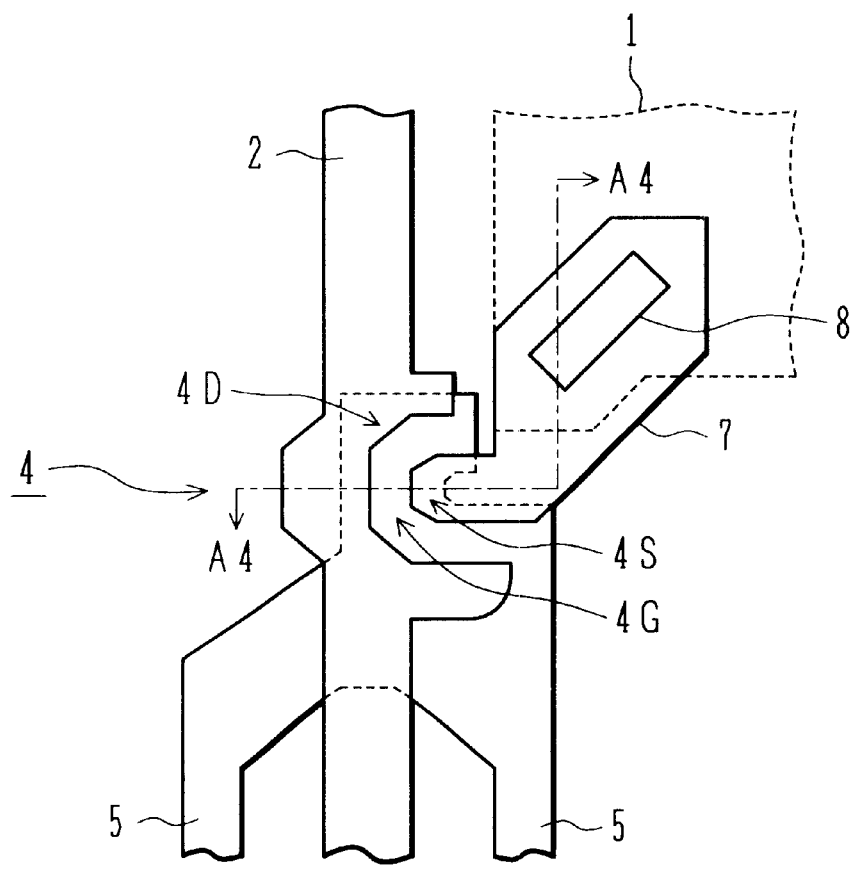
FIG. 2 is a plan view of a TFT of the liquid crystal display device of the first embodiment.

FIG. 2 is a plan view showing the details of TFT 4. The gate connection line 5 is formed in the lowest layer. The data bus line 2 and a pixel electrode connection portion 7 are disposed over the gate connection line 5, with a gate insulating film being interposed therebetween. The pixel electrode connection portion 7 has a convex portion 4S protruded toward the data bus line 2. The data bus line 2 has a concave portion 4D matching the convex portion 4S. A gap is defined between the convex portion 4S and concave portion 4D. A gate connection line 5 under this gap functions as the gate electrode 4G, the concave portion 4D becomes the drain electrode and the convex portion 4S becomes the source electrode. The pixel electrode connection portion 7 is connected via a contact hole 8 to the pixel electrode 1.

Figure 3:
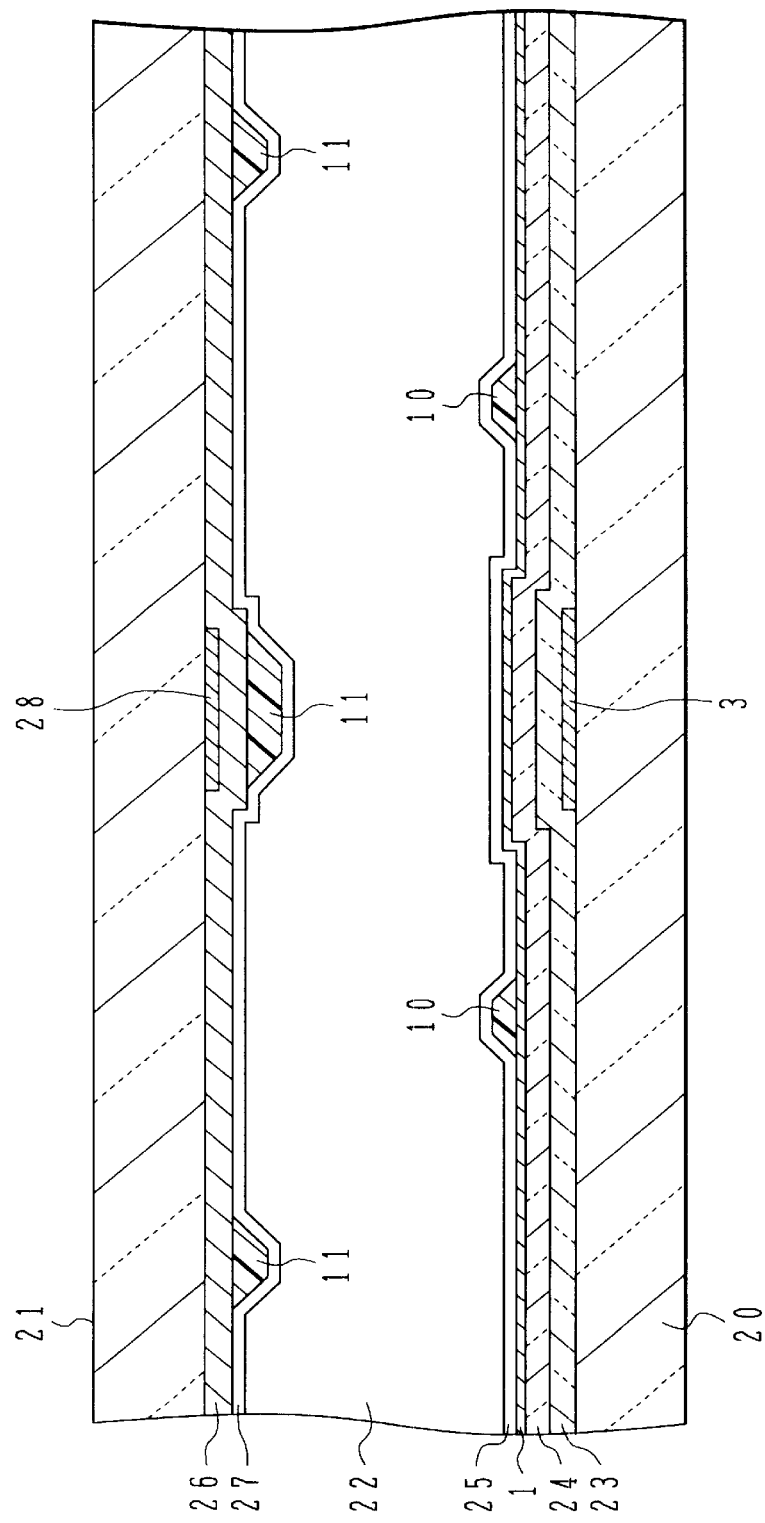
FIG. 3 is a cross sectional view showing a pixel area of the liquid crystal display device of the first embodiment.
Figure 4:
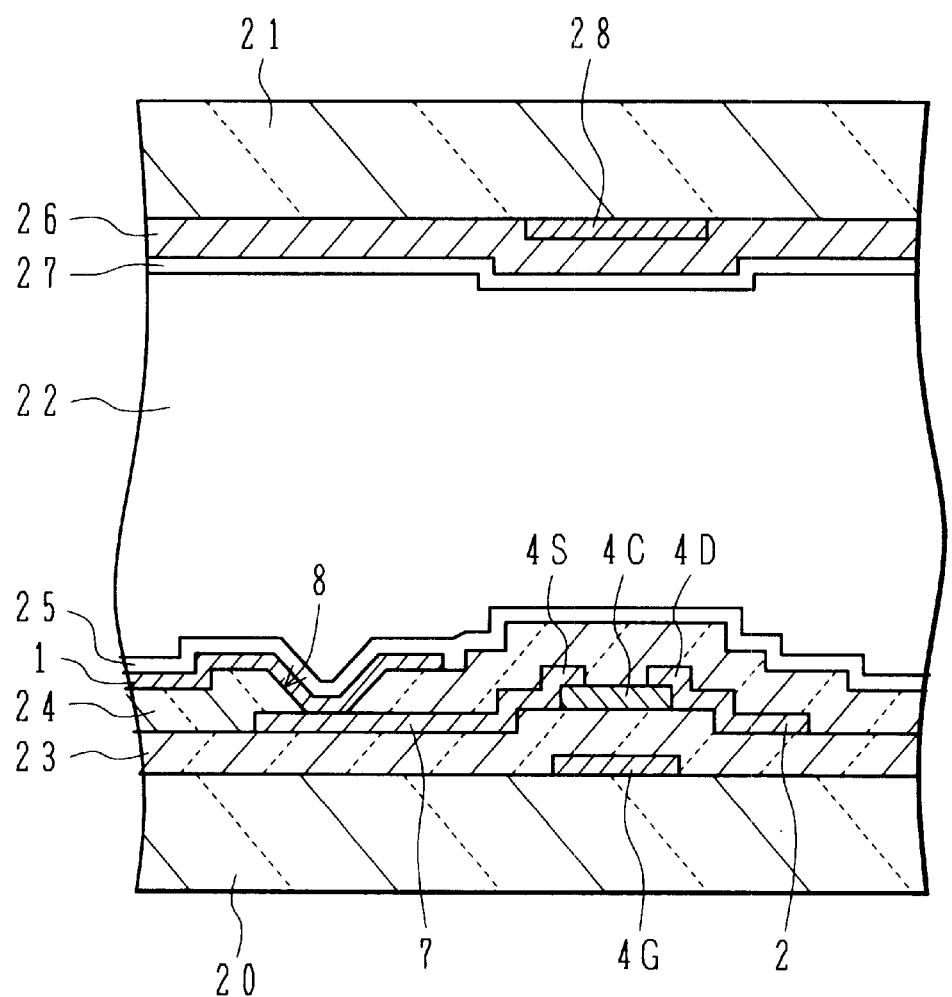
FIG. 4 is a cross sectional view showing a TFT area of the liquid crystal display device of the first embodiment.

FIG. 3 is a cross sectional view of a pixel area taken along one-dot chain line A3—A3 shown in FIG. 1, and FIG. 4 is a cross sectional view of a TFT area taken along one-dot chain line A4—A4 shown in FIG. 2. With reference to FIGS. 3 and 4, the structure of the liquid crystal display device of the first embodiment and its manufacture method will be described.

A TFT substrate 20 and an opposing substrate 21 made of glass face each other at a gap. Liquid crystal material 22 is filled in between the TFT substrate 20 and opposing substrate 21. The liquid crystal material 22 has negative dielectric anisotropy. Namely, the dielectric constant in the direction perpendicular to the director of a liquid crystal molecule is larger than that in the director.

On the opposing surface of the TFT substrate 20, a gate bus line 3 and a gate electrode 4G are formed. The gate electrode 4G corresponds to a partial area of the gate connection line 5 shown in FIG. 2. The gate bus line 3 and gate electrode 4G are formed by depositing a metal film such as a chrome (Cr) film and patterning it through photolithography. At the same time when the gate bus line 3 is formed, the gate connection line 5 and gate branch 6 shown in FIG. 1 are formed.

A gate insulating film 23 made of SiN is formed on the opposing surface of the TFT substrate 1, covering the gate bus line 3 and gate electrode 4G. For example, the gate insulating film 23 is formed by plasma enhanced chemical vapor deposition (PE-CVD).

In the TFT area shown in FIG. 4, a channel layer 4C made of amorphous silicon is formed on the surface of the gate insulating film 23 over the gate electrode, 4G. The amorphous silicon film is deposited by PE-CVD using $SiH_4$ as source gas. The amorphous silicon film is patterned through etching by a plasma asher, with a resist pattern being used as a mask.

A data bus line 2 and a pixel electrode connection portion 7 are formed on the gate insulating film 23. These line and portion 2 and 7 have a three-layer structure of Ti/Al/Ti. The Ti and Al films are formed by sputtering, and patterned by wet etching. The data bus line 2 is connected to the channel line 4C at the drain electrode 4D, and the pixel electrode connection portion 7 is connected to the channel layer 4C at the source electrode 4S.

In the pixel area shown in FIG. 3 and in the TFT area shown in FIG. 4, a protective film 24 made of SiN is formed on the gate insulating film 24, covering the channel layer 4C, data bus line 2 and pixel electrode connection portion 7. A pixel electrode 1 made of indium tin oxide (ITO) is formed on the protective film 24. The pixel electrode 1 is formed by depositing an ITO film through sputtering and then pattering it. The pixel electrode 1 is connected to the pixel electrode connection portion 7 via a contact hole 8 formed through the protective film 24.

On the pixel electrode 1 shown in FIG. 3, a first protrusion 10 is formed. The first protrusion 10 is made of insulating material such as positive type photoresist. A vertical alignment film 25 is formed over the whole substrate surface, covering the pixel electrode 1 and first protrusion 10.

On the opposing surface of the opposing substrate 21, a light shielding film 28 made of Cr is formed in an area corresponding to TFT 4 and in an area corresponding to the gate bus line 3. The light shielding film 28 is also formed in other areas where necessary. A common electrode 26 made of ITO is formed over the whole substrate surface, covering the light shielding film 28.

On the surface of the common electrode 26, a second protrusion 11 is formed. Similar to the first protrusion 10, the second protrusion 11 is made of insulating material such as positive type photoresist. A vertical alignment film 27 is formed over the whole substrate surface, covering the second protrusion 11.

The liquid crystal display device of the first embodiment has protrusions similar to those of the liquid crystal display device previously proposed and described with reference to FIG. 26. A plurality of domains are therefore formed in each pixel and the visual angle characteristics can be improved.

In the liquid crystal display device of the first embodiment, the gate bus line 3 is disposed at the position corresponding to the capacitance bus line 135 of the liquid crystal display device shown in FIG. 26. The gate bus line 3 has both the function of a light shielding film for shielding the area near the flection point of the protrusion and the function of an electrode of an auxiliary capacitance along with the pixel electrode as the other electrode. The bus line is not disposed between two pixel electrodes 1 adjacent in the column direction. Therefore, the area between two pixel electrodes 1 to be shielded can be made small and the aperture efficiency can be improved.

The gate connection line 5 not only transfers the control signal to TFT 4 but also has the function of one electrode of the auxiliary capacitance along with the pixel electrode 1. The gate connection line 5 has also the function of a light shielding film for preventing leak light to be caused by alignment disturbance near the border of the pixel electrode 1. The gate branch 6 also has the function of one electrode of the auxiliary capacitance and the function of a light shielding film.

In the liquid crystal display device shown in FIG. 1, gaps are formed between the gate connection line 5 and data bus line 2 and between the gate branch 6 and data bus line 2, as viewed along the substrate normal direction. These lines may be disposed so as not to form such gaps. The two gate connection lines 5 or the two gate branches 6 disposed on both sides of the data bus line 2 may be replaced by one thick wiring pattern.

Figure 5:
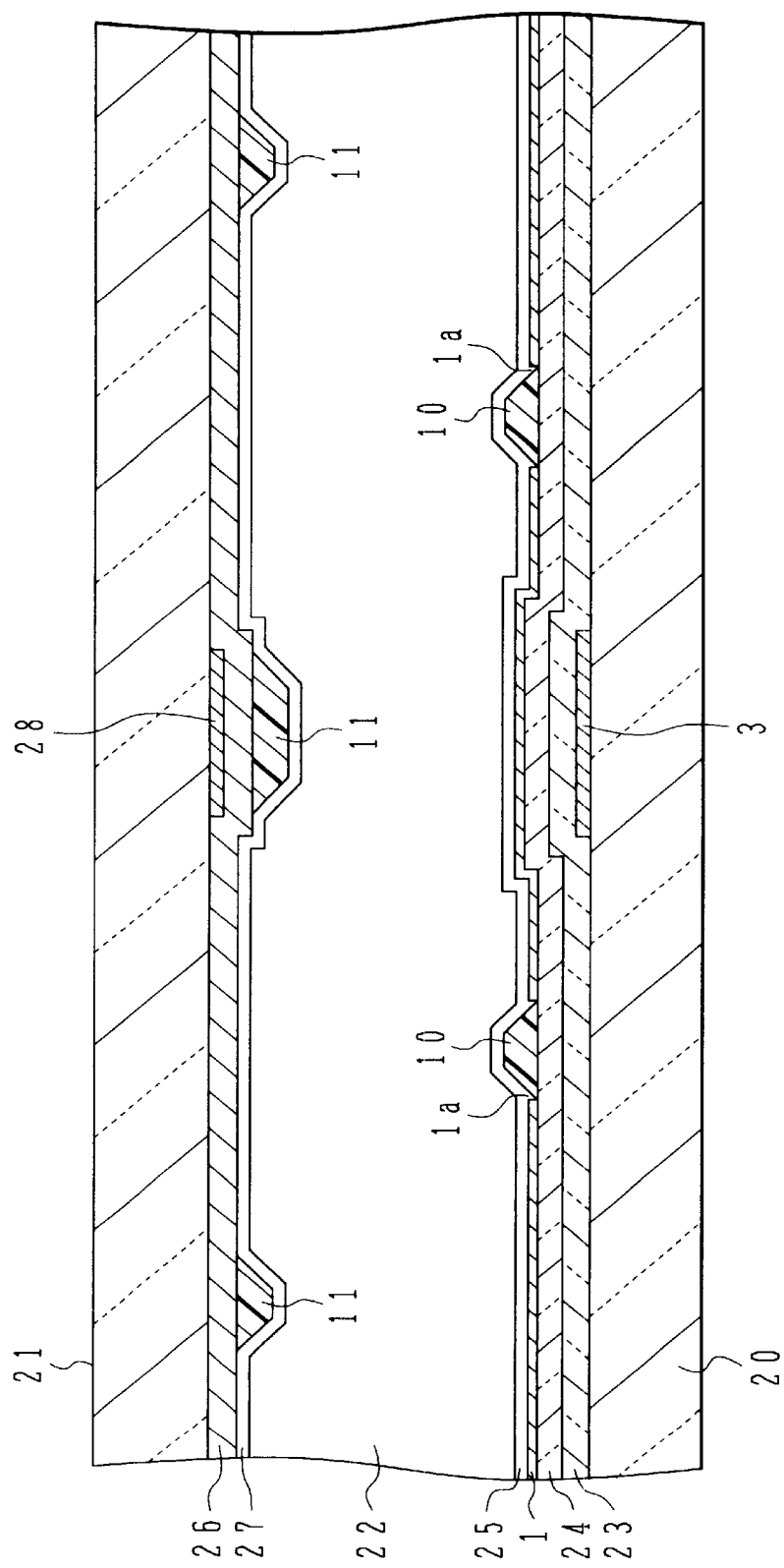
FIG. 5 is a plan view of a liquid crystal display device according to a second embodiment of the invention.

FIG. 5 is a cross sectional view of a liquid crystal display device according to the second embodiment. A plan view of the liquid crystal display device of the second embodiment is the same as that of the first embodiment shown in FIG. 1. The cross sectional view of FIG. 5 corresponds to that taken along one-dot chain line A3—A3 shown in FIG. 1.

In the first embodiment, the first protrusion 10 is disposed on the pixel electrode 1 as shown in FIG. 3. In the second embodiment, as shown in FIG. 5 a slit 1a matching the first protrusion 10 is formed in the pixel electrode 1. As viewed along the substrate normal direction, the slit 1a is inclusive of a partial area of the first protrusion 10 in the longitudinal direction. The other structures are the same as the first embodiment. The slit 1a is formed at the same time when the ITO film is patterned to form the pixel electrode 1.

If the slit is formed in the whole area where the first protrusion 10 overlaps the pixel electrode 1, the pixel electrode 1 is cut into a plurality of areas. In order to avoid disconnection of the pixel electrode 1, a portion of the ITO film under the first protrusion is left. For example, the ITO film is left near the cross point between the first protrusion 10 and the side of the pixel electrode.

If the pixel electrode 1 is disposed under the first protrusion 10 as shown in FIG. 3, electric lines of force near the first protrusion 10 are disturbed. Disturbed electric lines of force may disturb the alignment of liquid crystal molecules. In an area with the disturbed alignment of liquid crystal molecules, a light transmission factor cannot be controlled at a desired value. It is therefore necessary to shield the disturbed alignment area near the first protrusion 10. This lowers the aperture efficiency.

As in the second embodiment, since the pixel electrode 1 is not disposed under the first protrusion, disturbance of electric lines of force can be alleviated. Since the disturbed alignment area of liquid crystal molecules is localized near the first protrusion 10, the light shielding area can be made small.

The structure that the slit 1a matching the first protrusion 10 is formed may be applied to the liquid crystal display device previously proposed and shown in FIG. 26. Also in this case, disturbance of the alignment of liquid crystal molecules can be reduced.

Figure 6:
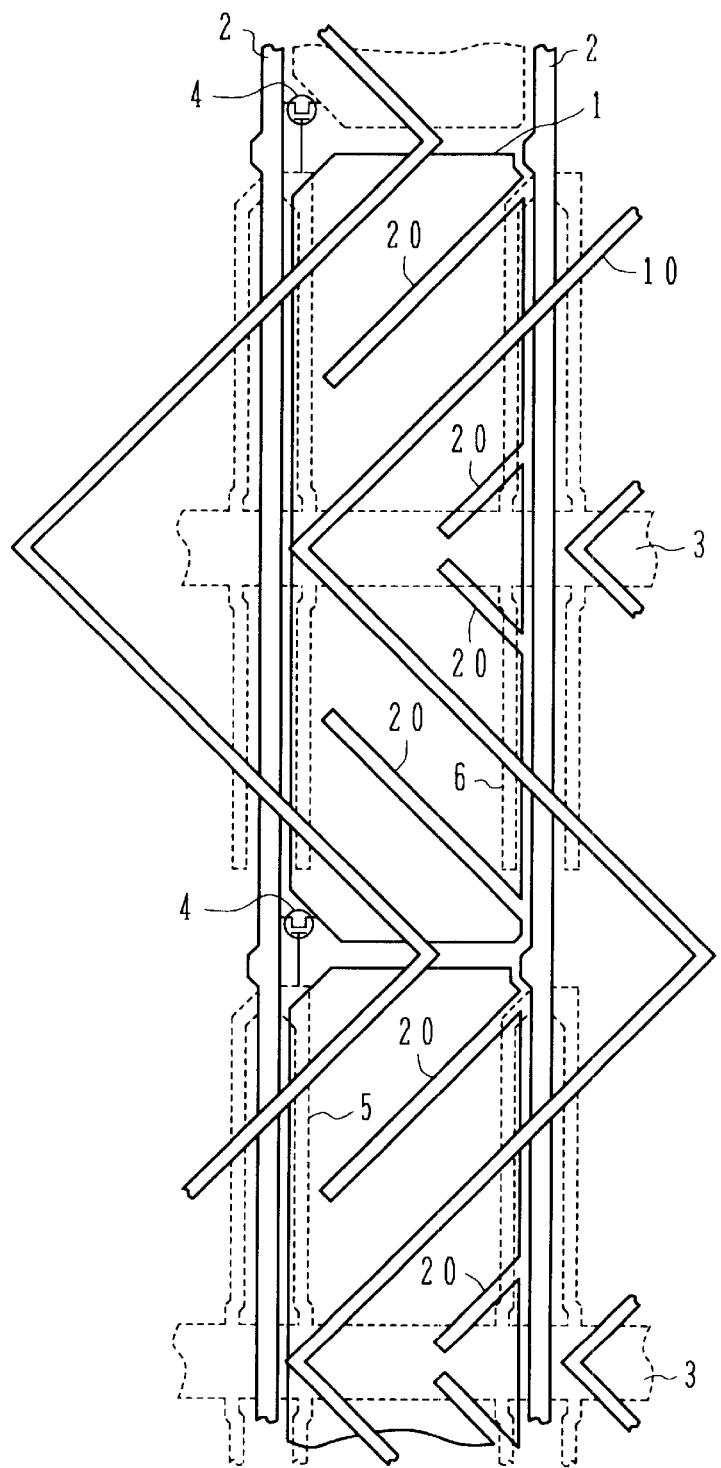
FIG. 6 is a plan view of a liquid crystal display device according to a third embodiment of the invention.

FIG. 6 is a plan view of a liquid crystal display device according to the third embodiment. In the first embodiment, borders of each domain are defined by the first and second protrusions 10 and 11 shown in FIG. 1. In the third embodiment, the second protrusion 11 is not formed on the opposing substrate. In place of the second protrusion 11, slits 20 are formed in the pixel electrode 1.

As viewed along the substrate normal direction, the slit 20 is disposed at the position corresponding to the second protrusion 11 shown in FIG. 1. The length of each slit 20 is predetermined so that a plurality of areas of the pixel electrode 1 partitioned by the slits 20 are not electrically disconnected.

The domain expanding from one first protrusion 10 and the domain expanding from another first protrusion 10 toward the one first protrusion 10 have different tilt directions of liquid crystal molecules. Therefore, a domain border is formed between two first protrusions 10. If structure for defining the domain border between two first protrusions 10 is not provided, the domain border is not fixed and becomes unstable.

As in the third embodiment, since the slits 20 are formed in the pixel electrode 1, an alignment restriction force relative to the liquid crystal molecules in the areas of the slits 20 weakens. Therefore, the domain border can be fixed to the areas of the slits 20.

Since the slits 20 are formed at the same time when the pixel electrode 1 is patterned, the number of processes does not increase. The second protrusions 11 of the first embodiment are not formed on the opposing substrate. The total number of processes can therefore be reduced.

Figure 7:
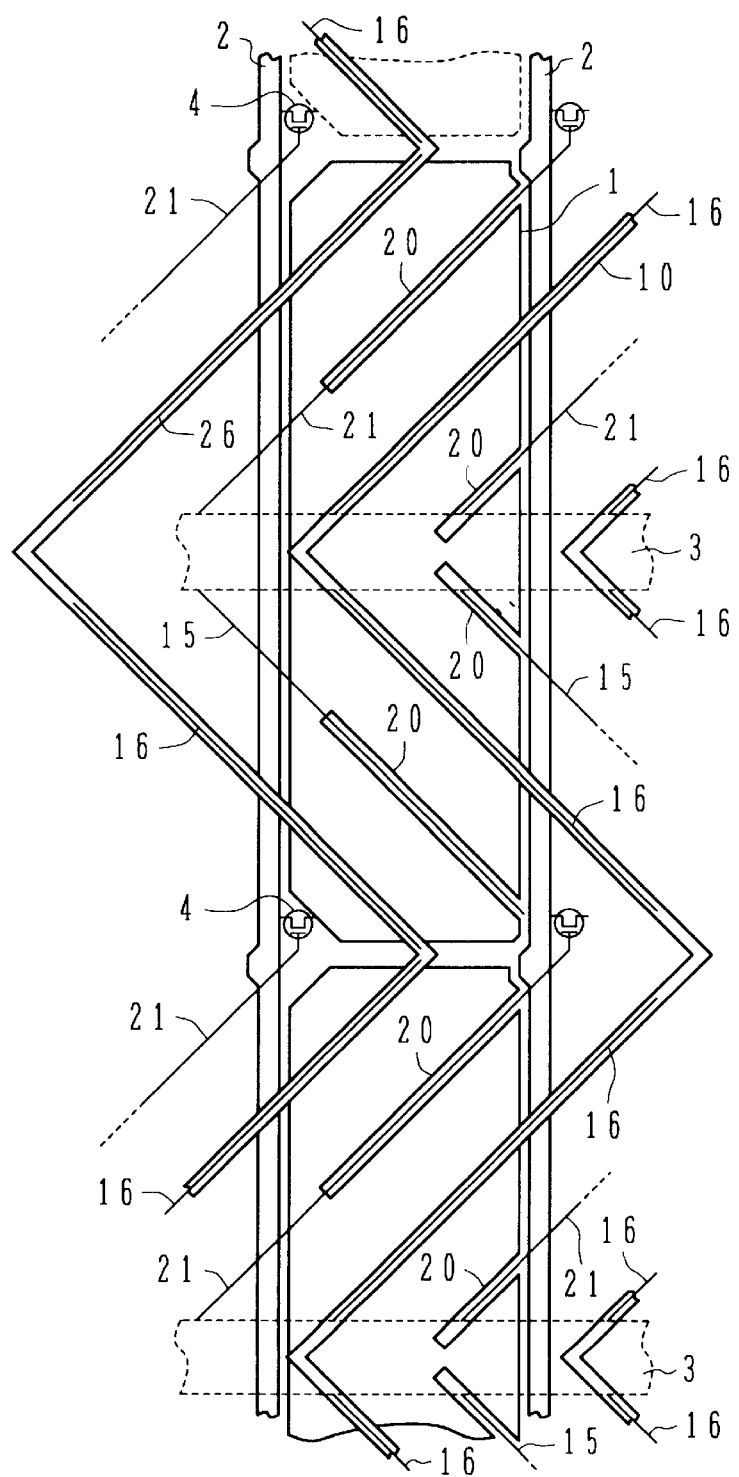
FIG. 7 is a plan view of a liquid crystal display device according to a fourth embodiment of the invention.

FIG. 7 is a plan view of a liquid crystal display device according to the fourth embodiment. Different points from the liquid crystal display device of the third embodiment shown in FIG. 6 will be described.

In the third embodiment, the gate connection line 5 is disposed along the side of the pixel electrode 1. This layout is used in order to positively form the auxiliary capacitance between the gate connection line 5 and pixel electrode 1. In the fourth embodiment, a gate connection line 21 is formed along a slit 20. This layout reduces the auxiliary capacitance between the gate connection line 21 and pixel electrode 1.

A proper value of the auxiliary capacitance is determined by the parasitic capacitance between the pixel electrode 1 and data bus line 2, a pixel capacitance between the pixel electrode 1 and common electrode, and the like. If the auxiliary capacitance of the structure shown in FIG. 6 is large, the structure of the fourth embodiment shown in FIG. 7 is used to reduce the auxiliary capacitance. The gate connection line 21 also serves as a light shielding film.

Of a plurality of slits 20, those slits not shielded by the gate connection lines 21 are provided with first gate branches 15. The gate branches 6 shown in FIG. 6 are not formed.

Both the gate connection line 5 shown in FIG. 6 and the gate connection line 21 shown in FIG. 7 may be used. Also, both the gate branch 6 shown in FIG. 6 and the first gate branch 15 shown in FIG. 7 may be used. How the gate connection lines and gate branches are disposed is determined from the necessary value of the auxiliary capacitance.

The second gate branch 16 may be extended from the gate bus line 3 along the first protrusion 10. The second gate branch 16 shields the area where the first protrusion 10 is disposed. Whether the second gate branches 16 are disposed or not can be judged from a relation among the necessary value of the auxiliary capacitance, an expected aperture efficiency and the like.

Figure 8:
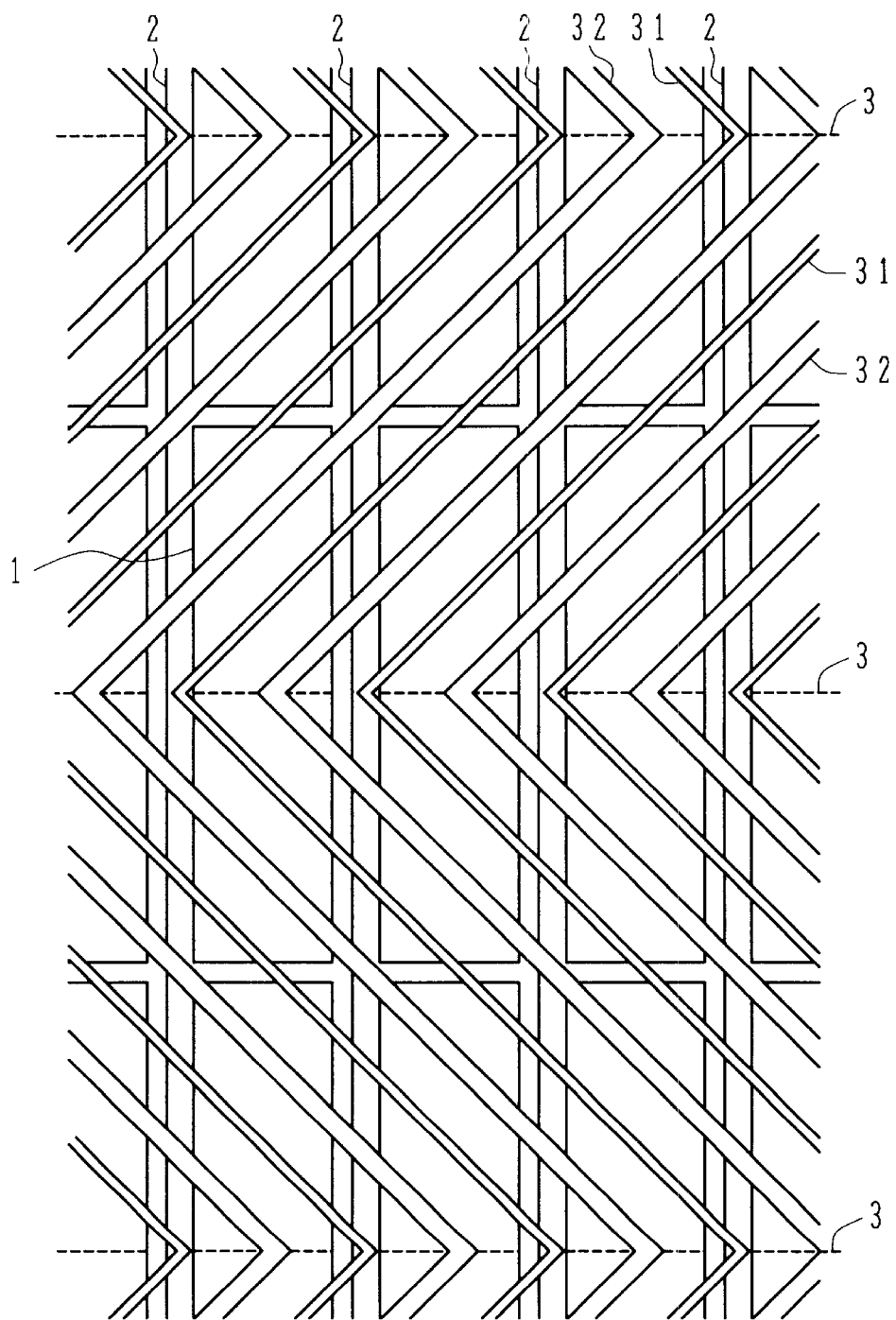
FIG. 8 is a plan view of a liquid crystal display device according to a fifth embodiment of the invention.

FIG. 8 is a plan view of a liquid crystal display device according to the fifth embodiment. In FIG. 8, TFT 4, gate connection lines 5 and gate branches 6 are not shown. These elements are not shown also in FIGS. 9 to 13 of the sixth to tenth embodiments. In the fifth to tenth embodiments, the gate connection lines and gate branches may be disposed along the side of the pixel electrode as shown in FIG. 1 of the first embodiment, or along the slits formed in the pixel electrodes 1 and first protrusions as shown in FIG. 7 of the fourth embodiment.

The layout of pixel electrodes 1, data bus lines 2 and gate bus lines 3 is the same as the first embodiment shown in FIG. 1. In the first embodiment, the first and second protrusions 10 and 11 have the flection points between two pixel electrodes 1 adjacent in the column direction and in the area of the gate bus line 3. In the fifth embodiment, first and second protrusions 31 and 32 have the flection points only in the area of the gate bus line 3. The first and second protrusions 31 and 32 are not bent in the border area of each pixel electrode 1.

In the first embodiment, since the first and second protrusions 10 and 11 are bent in the border area of each pixel electrodes 1, the alignment of liquid crystal molecules near the flection point is disturbed. The fifth embodiment is free of disturbance of the alignment of liquid crystal to be caused by the flections of the first and second protrusions 31 and 32. Therefore, a shielding area near the border of each pixel electrode 1 can be made small.

Figure 9:
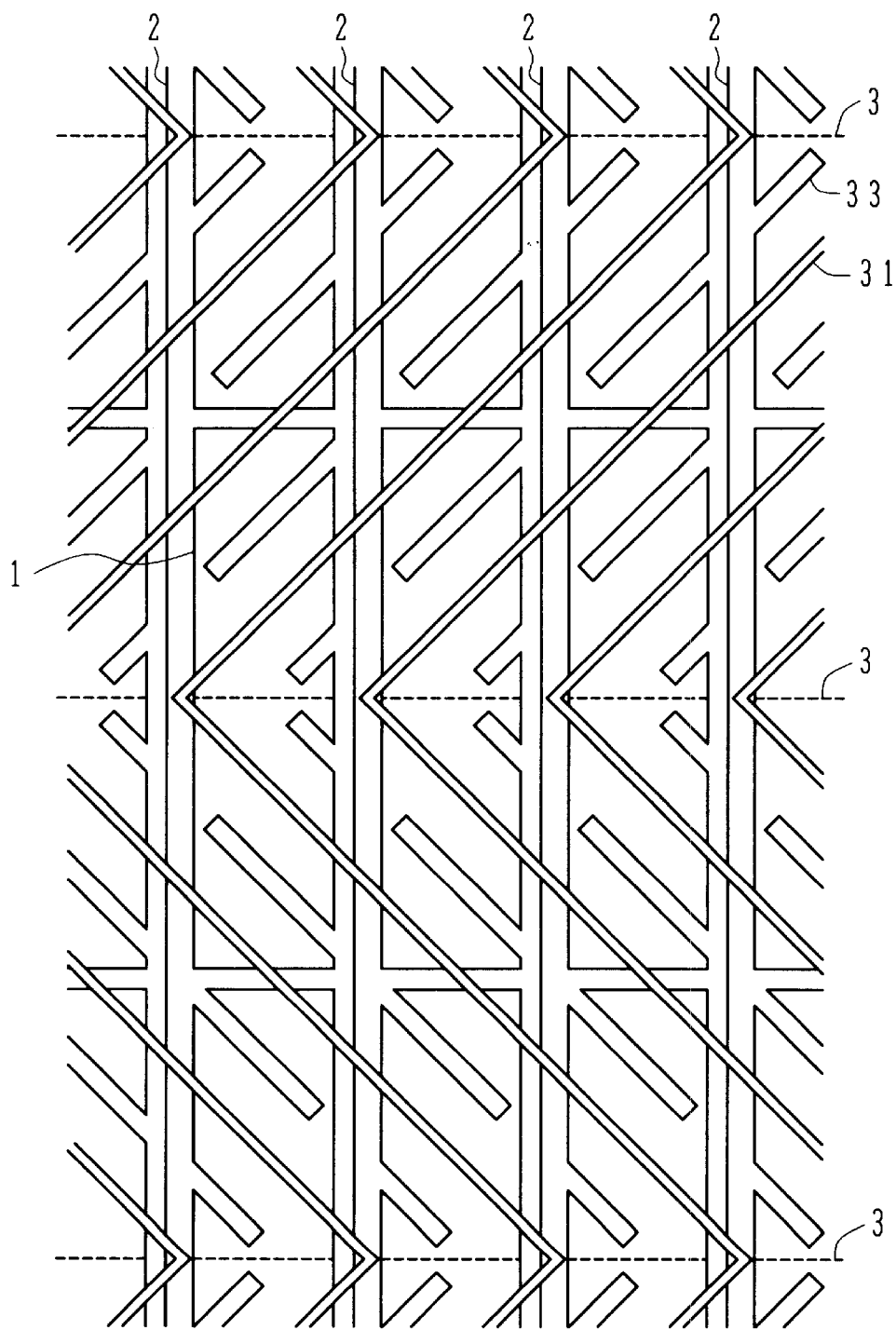
FIG. 9 is a plan view of a liquid crystal display device according to a sixth embodiment of the invention.

FIG. 9 is a plan view of a liquid crystal display device according to the sixth embodiment. In the sixth embodiment, in place of the second protrusion 32 of the fifth embodiment shown in FIG. 8, slits 33 are formed in the pixel electrode 1. Since the slits 33 define the domain borders, similar effects to those of the fifth embodiment can be obtained.

Figure 10:
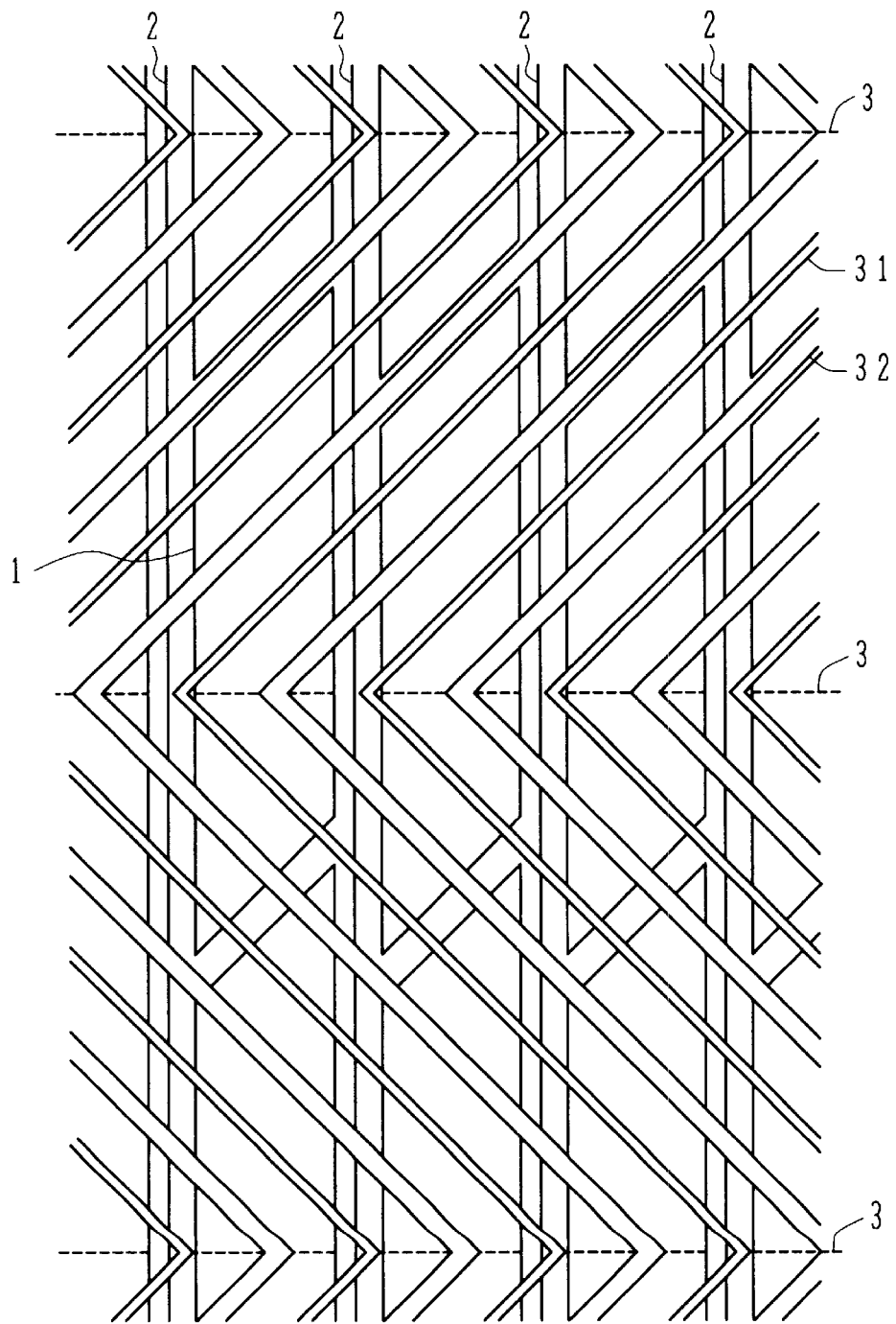
FIG. 10 is a plan view of a liquid crystal display device according to a seventh embodiment of the invention.

FIG. 10 is a plan view of a liquid crystal display device according to the seventh embodiment. Similar to the fifth embodiment, the first and second protrusions 31 and 32 have flection points only in the area of the gate bus line 3. The pixel electrode 1 has a shape like a parallelogram, with adjacent sides crossing at about 45°. The two sides (partitioning columns) of the pixel electrode extending in the column direction are disposed approximately in parallel to the data bus line 2.

One of the two opposite sides (partitioning rows) of the pixel electrodes 1 adjacent in the column direction is disposed along the second protrusion 32 and the other is disposed generally perpendicular to the first and second protrusions 31 and 32.

In the area near the side disposed along the second protrusion 32, disturbance of the alignment of liquid crystal molecules to be caused at a cross point between the side of the pixel electrode 1 and protrusion can be prevented. The shielding area can therefore be made small. In the area near the side generally perpendicular to the first and second protrusions 31 and 32, there is an alignment disturbance caused at a cross point between the side of the pixel electrode 1 and protrusion, and a shielding area somewhat broad is necessary. Since the shielding area near one of the two sides partitioning rows can be made small, the aperture efficiency can be improved.

Figure 11:
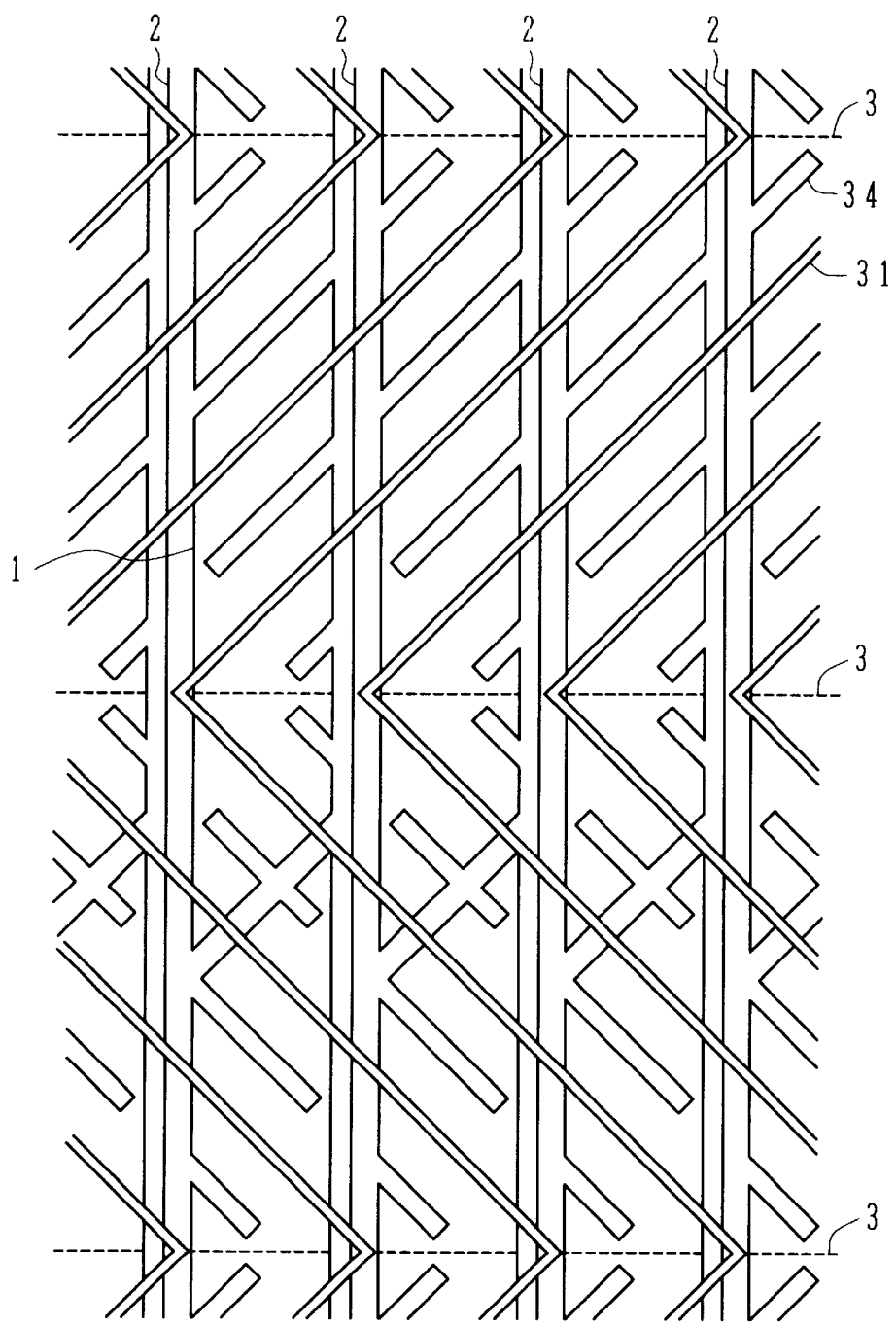
FIG. 11 is a plan view of a liquid crystal display device according to an eighth embodiment of the invention.

FIG. 11 is a plan view of a liquid crystal display device according to the eighth embodiment. In the eighth embodiment, in place of the second protrusion 32 of the seventh embodiment shown in FIG. 10, slits 34 are formed in the pixel electrode 1. Since the slits 34 define domain borders, similar effects to the seventh embodiment can be obtained.

Figure 12:
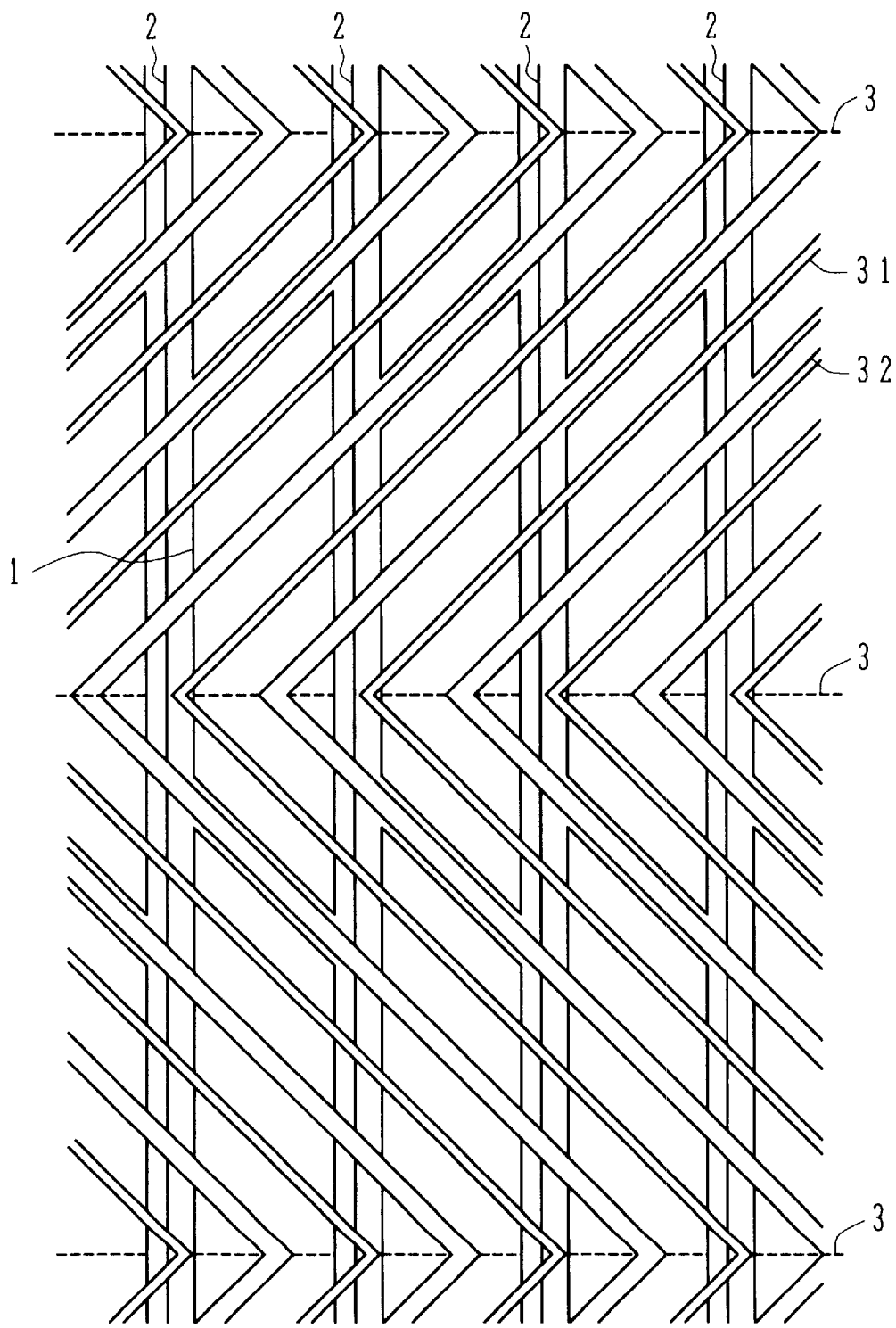
FIG. 12 is a plan view of a liquid crystal display device according to a ninth embodiment of the invention.

FIG. 12 is a plan view of a liquid crystal display device according to the ninth embodiment. Similar to the fifth embodiment, the first and second protrusions 31 and 32 have flection points only in the area of the gate bus line 3. The pixel electrode 1 has a shape like an isosceles trapezoid, with the lower bottom side and slanted side crossing at about 45°. The upper and lower bottom sides (partitioning columns) of the isosceles trapezoid are disposed along the data bus line 2. The other two sides (partitioning rows) are disposed along the second protrusion 32.

In the seventh embodiment, only one of the sides partitioning rows of parallelogram pixel electrodes 1 is disposed along the second protrusion 32. In the ninth embodiment, two sides partitioning rows are disposed along the second protrusion 2. Therefore, the shielding area near these sides can be made small and the aperture efficiency can be improved further. In place of the second protrusion, slits may be formed in the pixel electrode 1.

Figure 13:
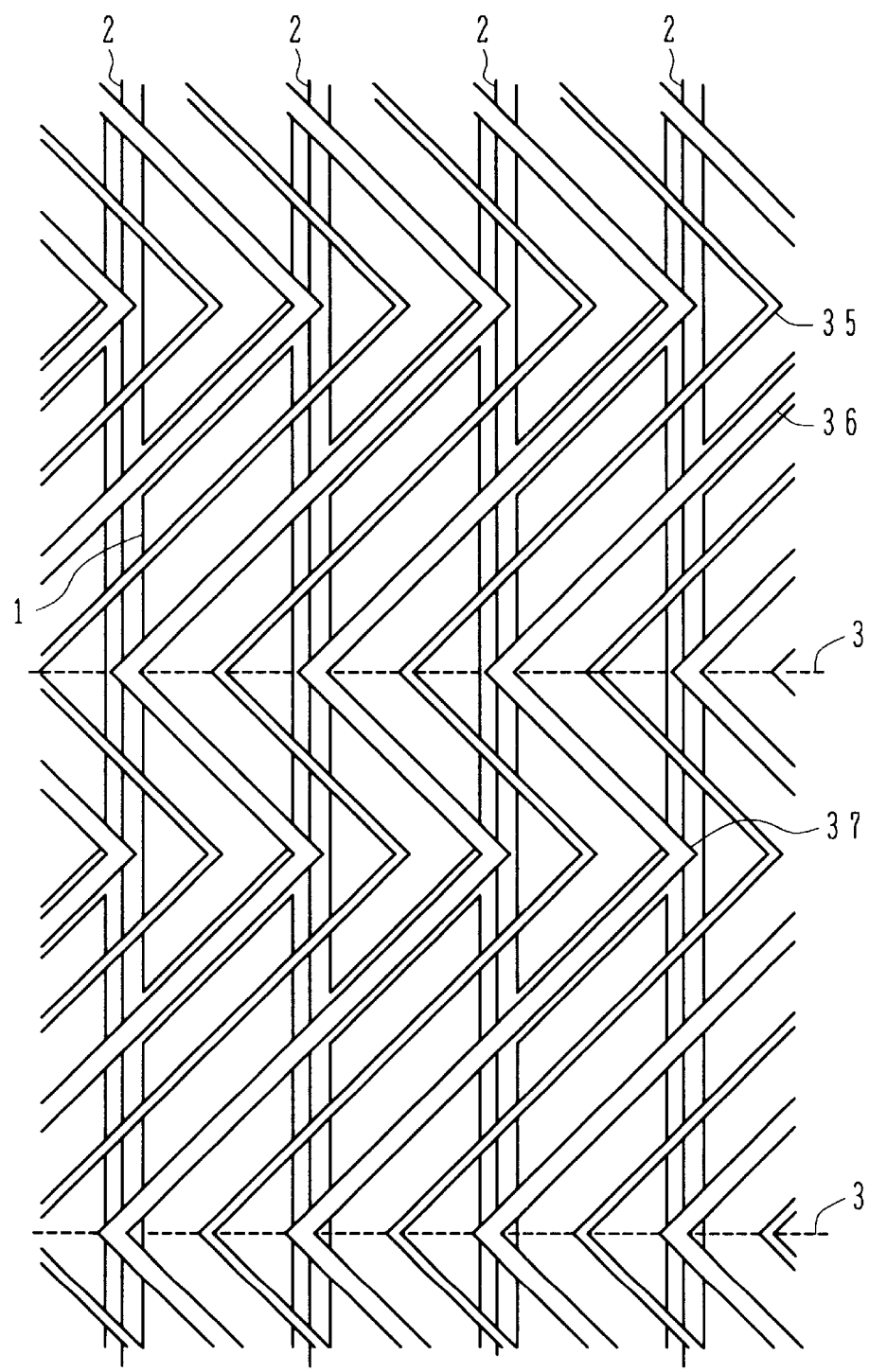
FIG. 13 is a plan view of a liquid crystal display device according to a tenth embodiment of the invention.

FIG. 13 is a plan view of a liquid crystal display device according to the tenth embodiment. In the ninth embodiment shown in FIG. 9, the pixel electrode has a trapezoidal shape and the two sides are disposed in parallel to the second protrusion 32. In the tenth embodiment, the pixel electrode 1 has a parallelogram shape similar to the pixel electrode 1 shown in FIG. 10 and the shapes of the first and second protrusions are changed to make the two sides partitioning rows in parallel to the second protrusion.

Of the two second protrusions 36 disposed along the two sides partitioning rows of pixel electrodes 1, one protrusion is bent toward the inside of the pixel electrode 1 at a right angle near the apex of the pixel electrode 1 having an obtuse angle. The second protrusion 36 bent toward the inside of the pixel electrode is again bent toward the inside of the pixel electrode 1 when it reaches the border of the pixel electrode 1, and extends in parallel with the side partitioning rows of pixel electrodes.

Similar to the ninth embodiment, also in the tenth embodiment, the alignment disturbance of liquid crystal molecules near the sides partitioning rows of pixel electrodes 1 can be reduced. Along a virtual straight line passing the flection point 37 near the apex of the pixel electrode 1 having an obtuse angle and extending in the row direction, flection points of the first and second protrusions 35 and 36 are disposed. It is preferable to shield the area extending along the virtual straight line in order to prevent leak light to be caused by the alignment disturbance of liquid crystal molecules in this area.

Next, the eleventh to fourteenth embodiments will be described. The first to tenth embodiments are characterized in the relative positions of the gate bus line and pixel electrode. The eleventh to fourteenth embodiments to be described below are characterized in the structure of a protrusion that defines domain borders.

In the first to tenth embodiments, the protrusion is made of resist material. Other materials may also be used, including transparent or semitransparent resin such as polyimide resin, acrylic resin and novolak resin and insulating materials such as silicon nitride (SiN) and silicon oxide ($SiO_2$). The cross section of the protrusion is, for example, a triangle. The alignment of liquid crystal molecules near the apex of the protrusion is different from that of liquid crystal molecules in the inner area of each domain. Therefore, the alignment of liquid crystal molecules is disturbed and phenomena such as leak light or blacking occur in this area and an effective aperture efficiency is lowered.

Figure 14:
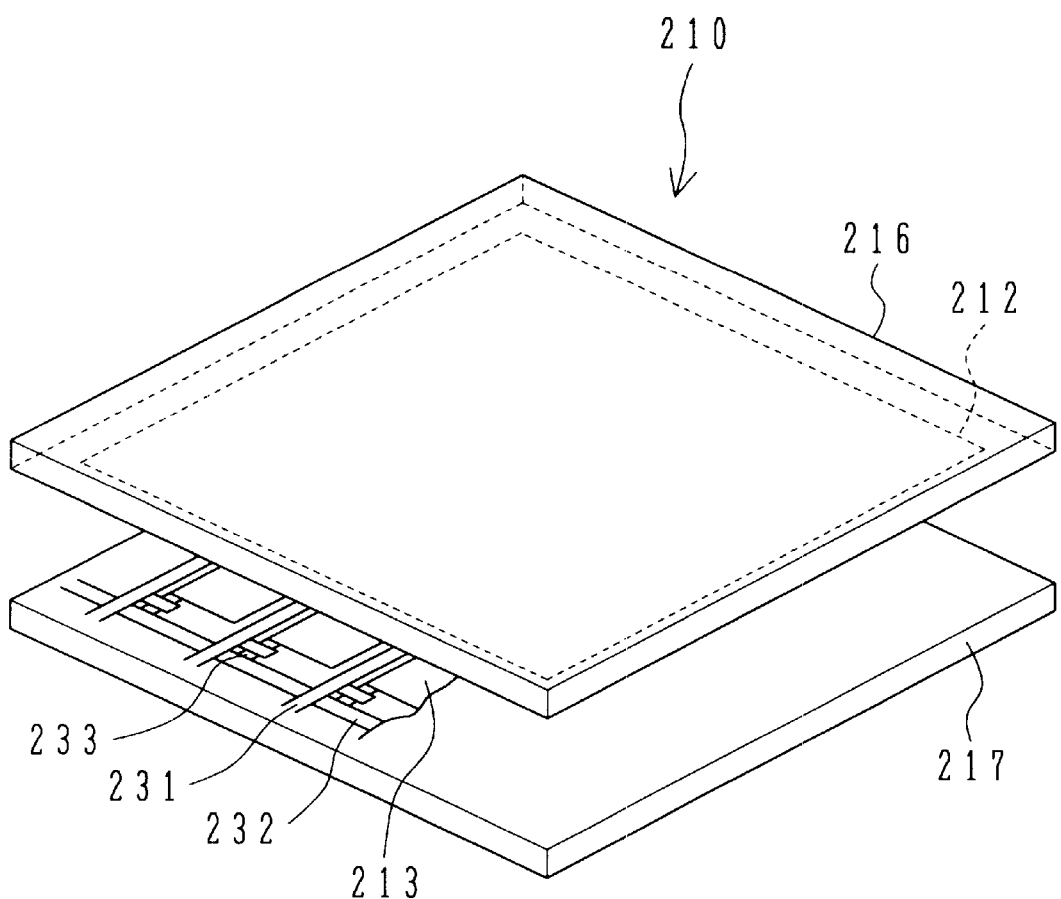
FIG. 14 is a perspective view showing the fundamental structure of a liquid crystal display device according to eleventh to fourteenth embodiments.

FIG. 14 is a perspective view showing the fundamental structure of a liquid crystal display device according to the eleventh to fourteenth embodiments. A liquid crystal display device 210 has a pair of glass substrates 216 and 217 disposed facing each other. On the opposing surface of the glass substrate 216, an opposing electrode (common electrode) 212 is formed. On the opposing surface of the other glass substrate 217, a plurality of gate bus lines (scan bus lines) 231, a plurality of drain bus lines (data bus lines) 232, and a plurality of TFTs 233 and pixel (cell) electrodes 213 are formed. The data bus line 232 crosses the gate bus line 231 at a right angle. TFT 233 and pixel electrode 213 are disposed in an area near the cross point between the gate bus line 231 and drain bus line 231.

The opposing surface of each substrate is subjected to the vertical alignment process in order to vertically align liquid crystal molecules. Negative type liquid crystal material is filled in between the two substrates. On the opposing surface of the glass substrate 216, color filters are disposed in many cases. Generally, the glass substrate 216 is called a color filter substrate (CF substrate), and the other glass substrate 217 is called a TFT substrate.

Figure 15:
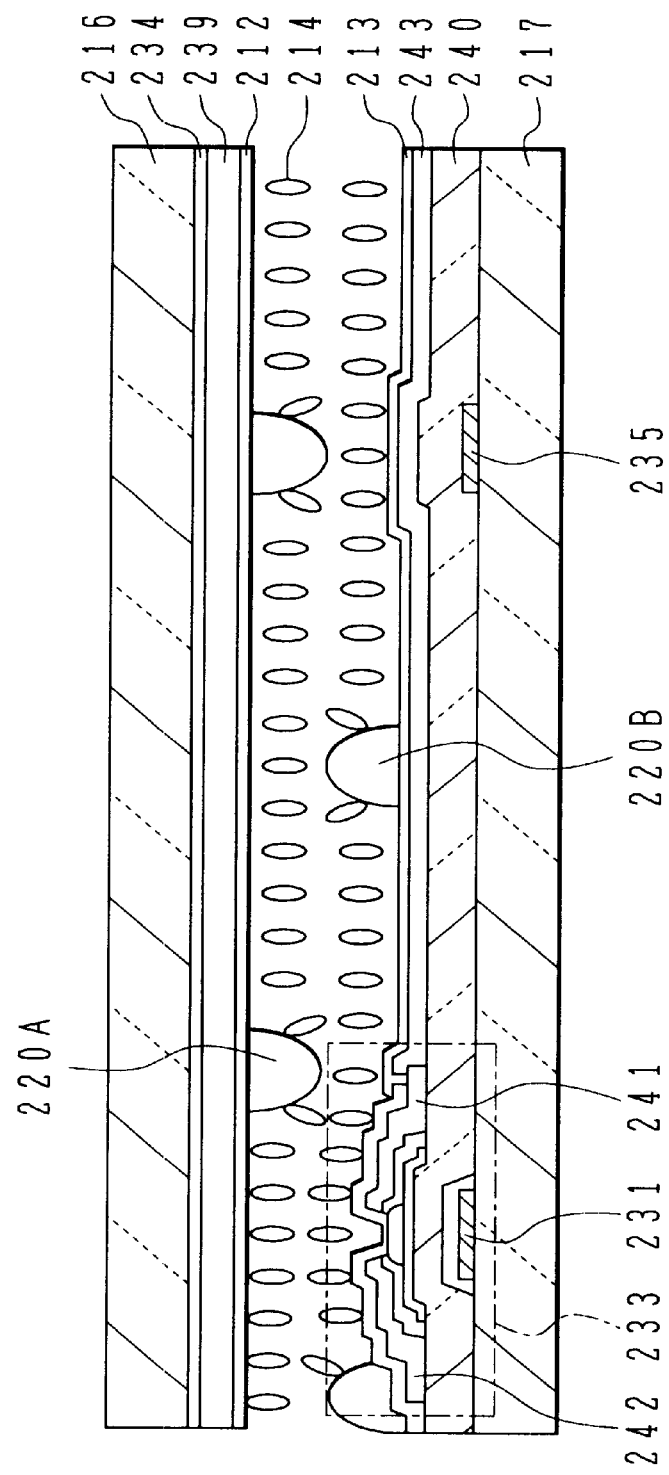
FIG. 15 is a cross sectional view showing the fundamental structure of the liquid crystal display device according to the eleventh to fourteenth embodiments.

FIG. 15 is a cross sectional view of the liquid crystal display device of the embodiments. On the opposing surface of the glass substrate 216, a black matrix layer 234, a color filter 239, an opposing electrode 212 made of ITO and protrusions (domain regulating structure) 220A are formed. Although a vertical alignment film is formed thereon, it is omitted in FIG. 15.

On the opposing surface of the other glass substrate 217, gate bus lines 231, capacitance bus lines (CS electrodes) 235, insulating films 240 and 243, pixel electrodes 213 and protrusions 220B are formed. Although a vertical alignment film is formed thereon, it is omitted in FIG. 15. The source region 241 of TFT is connected to the pixel electrode 213. The drain region 242 is continuous with the drain bus line.

In FIG. 15, although the protrusions 220A and 220B are formed on the opposing surfaces of the CF substrate and TFT substrate, they may be formed on only one of the two substrates.

Figure 16A:
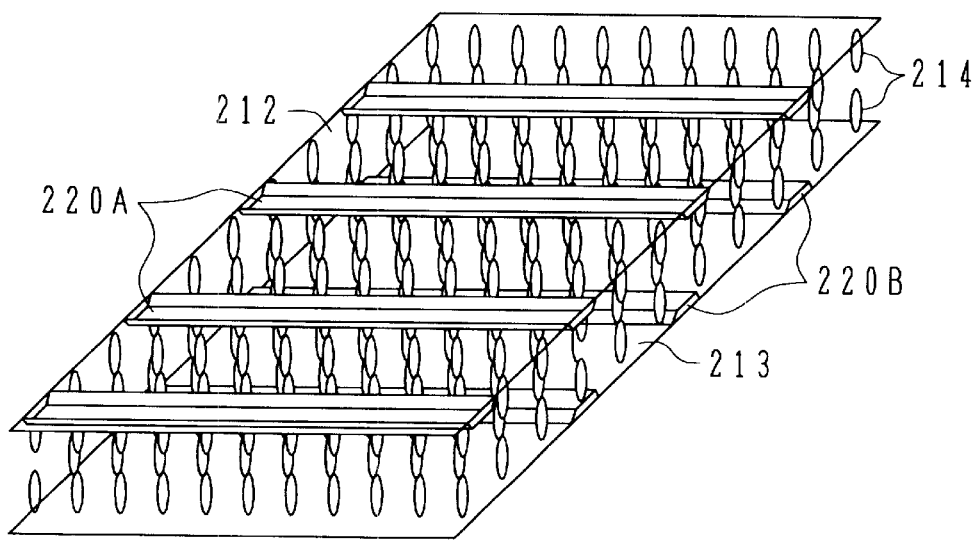
FIGS. 16A and 16B are a perspective view and a cross sectional view showing the arrangement of protrusions of the liquid crystal display device according to the eleventh to fourteenth embodiments.
Figure 16B:
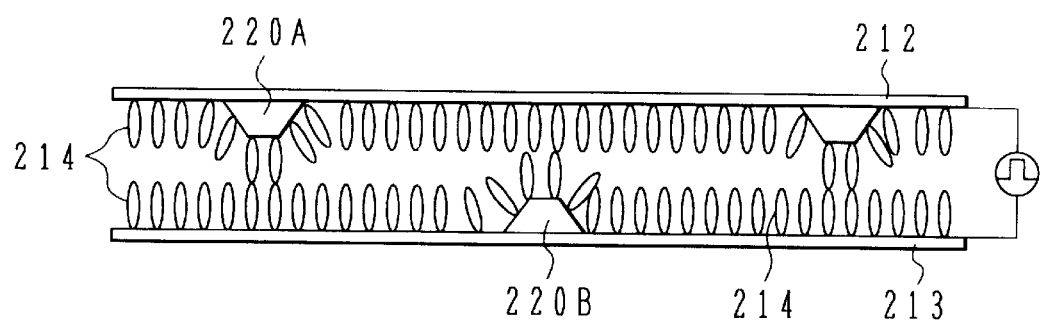

As shown in FIG. 16A, protrusions 220A and 220B both extend in one direction and are disposed at an equal pitch in parallel. As shown in FIG. 16B, the protrusions 220B are disposed shifted by a half pitch from the protrusions 220A. A plurality of alignment areas (domains) are defined each being defined between the protrusions 220A and 220B. The alignment state of liquid crystal molecules 14 shown in FIGS. 16A and 16B is obtained while no voltage is applied.

Figure 17:
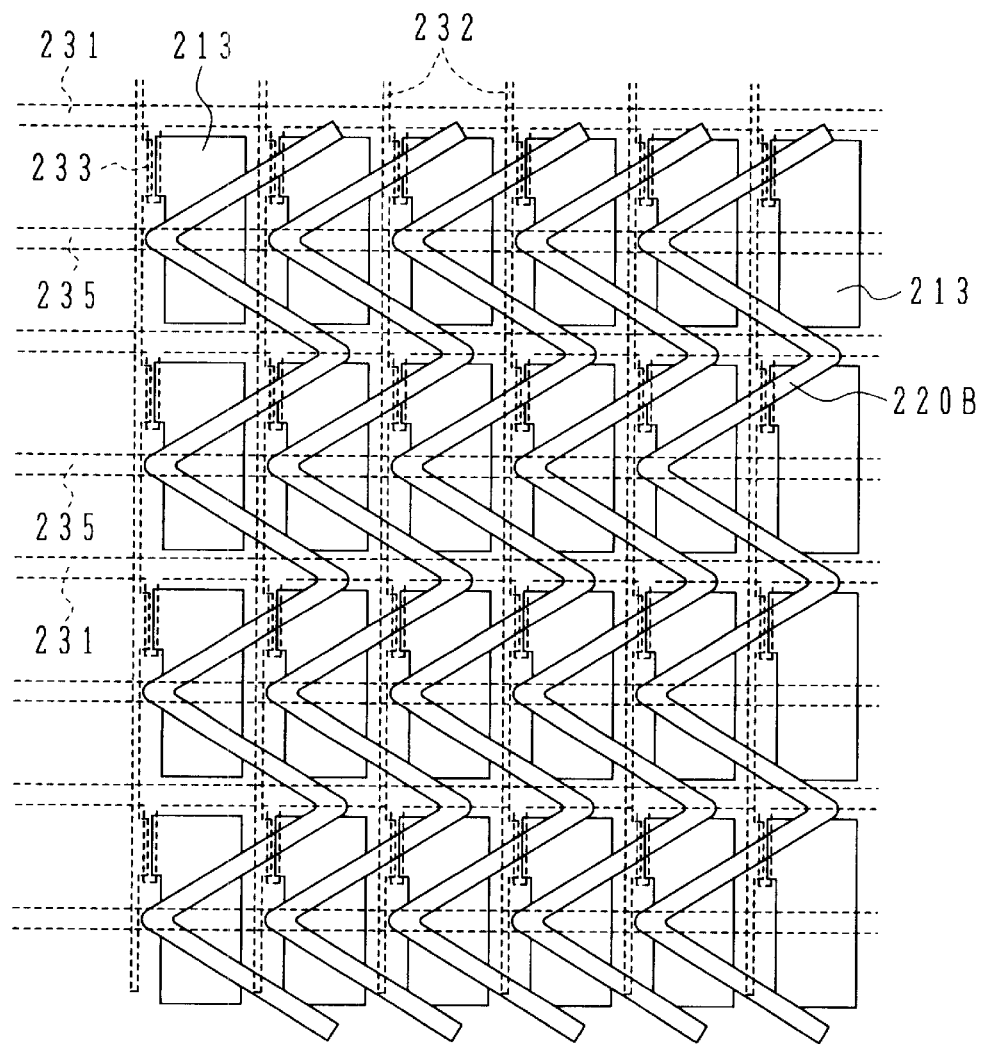
FIG. 17 is a plan view showing the fundamental structure of a TFT substrate of the liquid crystal display device according to the eleventh to fourteenth embodiments.

FIG. 17 is a plan view of a TFT substrate formed with patterns 220B. The protrusions 220B has a zigzag shape and pass over the pixel electrodes 213 and TFTs 233. The cross section of the protrusion has a shape having a slanted side relative to the surface of the pixel electrode 213, for example, triangular or trapezoidal. The shape of the protrusion 220B shown in FIG. 17 is only illustrative and other shapes effective for defining a plurality of domains may also be used. The protrusions 220A on the CF substrate shown in FIG. 15 may also have various cross sections.

Figure 18:
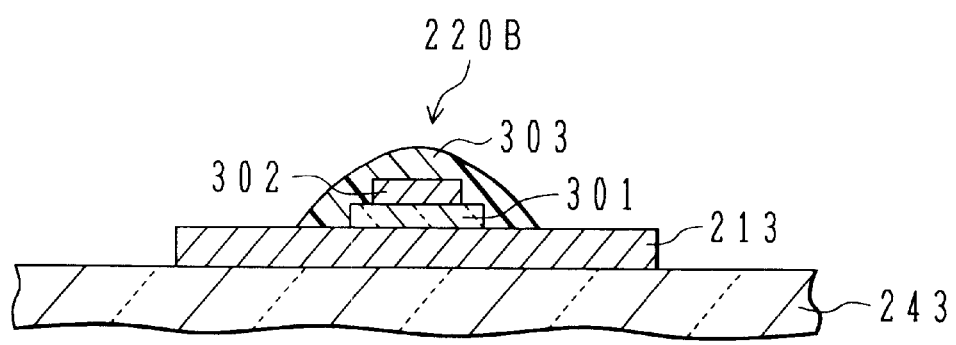
FIG. 18 is a cross sectional view of a protrusion of the liquid crystal display device according to the eleventh to fourteenth embodiments.

FIG. 18 is a cross sectional view of the protrusion 220b formed on the pixel electrode 213. An insulating film 301 of insulating material is formed on a partial surface area of the pixel electrode 213, and on this insulting film 301 a conductive film 302 of conductive material is formed. The conductive film 302 is covered with a cover film 303 of insulating material. The insulating film 301, conductive film 302 and cover film 303 constitute the protrusion 220B.

With reference to FIGS. 19A to 19D, a method of forming the protrusion 220B will be described.

Figure 19A:
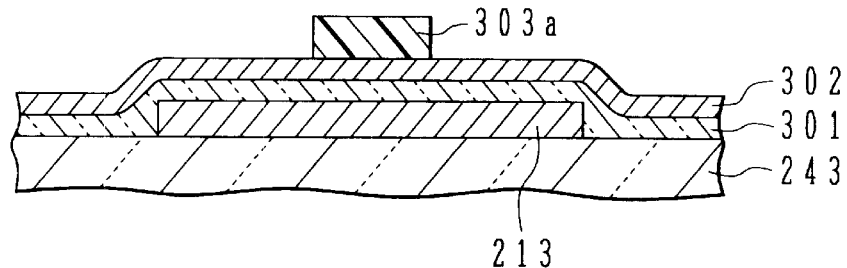
FIGS. 19A to 19D are cross sectional views illustrating a method of forming the protrusion shown in FIG. 18.

As shown in FIG. 19A, the insulating film 301 and conductive film 302 are formed covering the pixel electrode 213. A pattern 303a to be later used as the cover film 303 is formed on the conductive film 302.

Figure 19B:
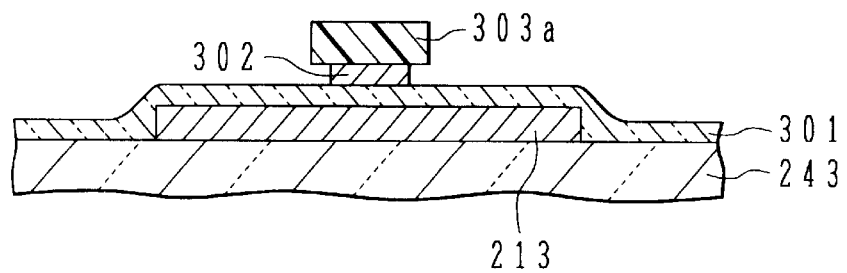

As shown in FIG. 19B, by using the pattern 303a as a mask, the conductive film 302 is etched. Since the conductive film 302 is side-etched, the conductive film 302 has a shape narrower than the pattern 303a.

Figure 19C:
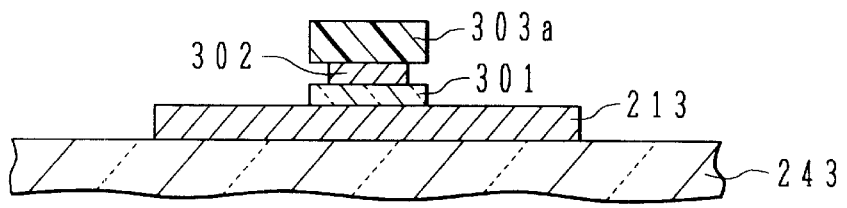

As shown in FIG. 19C, by using the pattern 303a as a mask, the insulating film 301 is anisotropically etched to lave a pattern of the insulating film 301 having generally the same width as the pattern 303a. The insulating film 103 may be etched isotropically to narrow the pattern width of the insulating film 301 more than that of the pattern 303a.

Figure 19D:
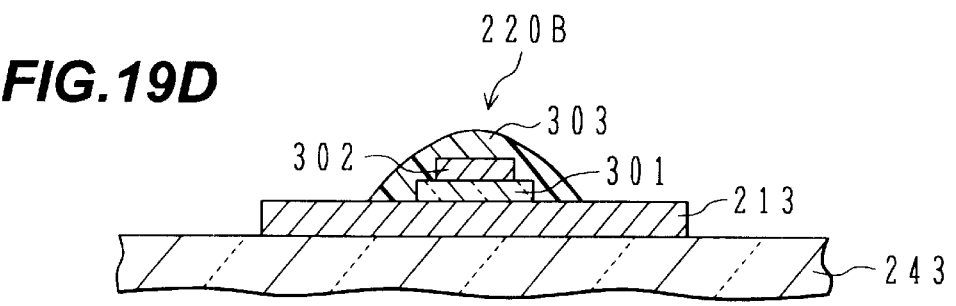

As shown in FIG. 19D, the substrate is heated to fluidize the pattern 303a. The pattern 303a flows to both sides of the conductive film 303 and insulating film 301 and the cover film 303 covering the films 303 and 301 is formed. The cover film 303 has a surface slanted relative to the surface of the pixel electrode 213.

The insulating film 301 is made of material having a higher melting point or softening point than that of the material of the pattern 303a, so that the insulating film 301 is hard to be melted or fluidized when the pattern 303a is fluidized. Generally, the material of the insulating film 301 may be heat resistant organic material such as polyimide or inorganic material such as silicon nitride and silicon oxide.

If the protrusion 220B is formed on the vertical alignment film, the cover film 303 becomes in direct contact with liquid crystal material. It is therefore preferable not to use material that adversely affects the characteristics of the liquid crystal display device as the material of the cover film 303. If the cover film 303 is made of photosensitive material, the pattern 303a shown in FIG. 19A can be formed through exposure and development and the number of processes can be reduced. If the cover film 303 is made of non-photosensitive material, by using a resist pattern as a mask in the process shown in FIG. 19A, the non-photosensitive material layer is etched to form the pattern 303a. The preferred material of the cover film 303 is resist, typically photosensitive novolak resin.

The conductive film 302 is made of metal material such as a single metal including chrome, aluminum, nickel, molybdenum, tungsten, titanium and copper or an alloy thereof. A multi-layer structure having a layer made of a single metal and an alloy layer may also be used.

The conductive film 302 of the protrusion 220A shown in FIG. 18 is made of transparent metal. It is therefore possible to prevent leak light to be caused by disturbed alignment of liquid crystal molecules near the protrusion 220A. In order to further enhance this effect, one or both of the insulating film 301 and cover film 303 may be made of material such as black colored material.

Since the protrusion 220A includes the conductive film 302, it is possible, as will be later described, to repair a disconnected drain bus line or gate bus line. The protrusion 220A can be used as the electrode of the auxiliary capacitance for stabilizing display. If the auxiliary capacitance is formed by using the protrusion 220A, the capacitance bus line. 235 shown in FIG. 15 can be omitted.

The insulating film 301 shown in FIG. 18 is preferably set to have a thickness sufficient for electrically insulating the conductive film 302 from the pixel electrode 213. Proper thickness and width of the conductive film 302 are determined by taking into consideration the applications to a repair line to be later described and to an auxiliary capacitance electrode. The cover film 303 is set so that it can sufficiently cover the conductive film and it has a thickness and width sufficient for operating as domain border regulating structure. In designing the width of the cover film 303, the width of the underlying conductive film 302 is taken into consideration.

The liquid crystal display device shown in FIG. 14 can be manufactured by a method of manufacturing a general liquid crystal display device, excepting the process of forming the protrusion.

Generally, the liquid crystal display device manufacture process includes a TFT substrate forming process and a CF substrate forming process. The TFT substrate forming process is classified into a substrate washing process, a gate bus line forming process, a channel layer forming process, an element isolating process, a protective film forming process, a pixel electrode forming process and the like. The CF substrate forming process includes a black matrix layer forming process, a color filter forming process and an opposing electrode forming process.

The protrusion 220B shown in FIG. 18 is formed on the pixel electrode after the pixel electrode forming process. The protrusion 220A on the CF substrate shown in FIG. 15 is formed on the opposing electrode after the opposing electrode forming process.

Next, with reference to FIG. 20, the eleventh embodiment of a liquid crystal display device will be described, the fundamental structure thereof being shown in FIGS. 14 and 15.

Figure 20:
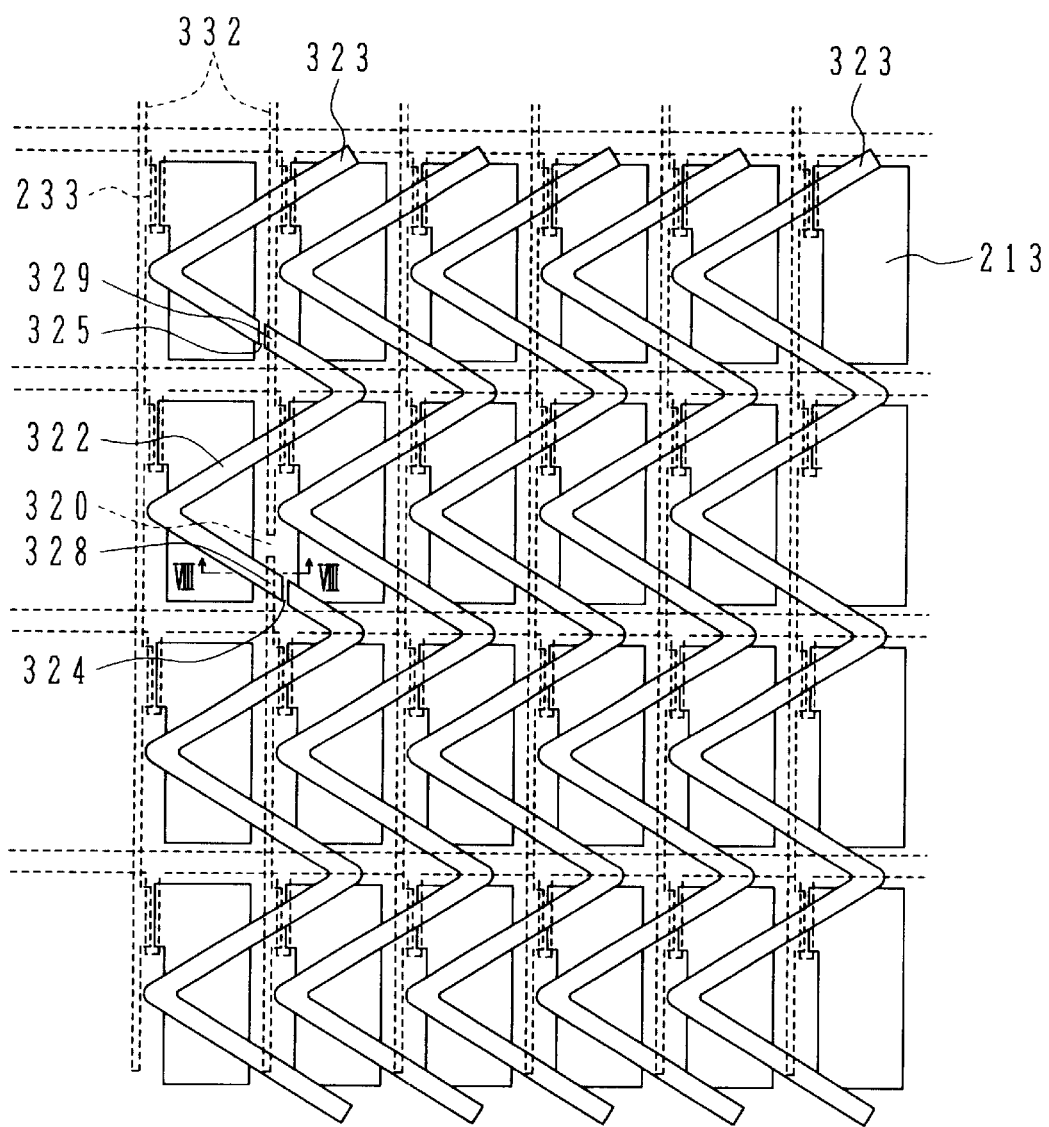
FIG. 20 is a plan view showing a TFT substrate of the liquid crystal display device of the eleventh embodiment.

FIG. 20 is a plan view of the liquid crystal display device of the eleventh embodiment. The gate bus lines 231 are formed by a usual process on the opposing surface of the transparent glass substrate 217 shown in FIG. 15. Next, the channel layer is formed, then an element isolation process is performed, and the protective film 243 is formed. On this protective film 243, the pixel electrode 213 is formed. The widths of the gate bus line 231 and drain bus line 232 formed on the TFT substrate are 10 μm and 5 μm, respectively.

Next, as described with FIG. 19A, on the pixel electrode 213, the insulating film 301 made of polyimide and having a thickness of 0.4 μm and the conductive film 302 made of chrome and having a thickness of 0.2 μm are formed. On the conductive film 302, photosensitive novolak resin is deposited to a thickness of 2 μm to thereafter leave the pattern 303a having a width of 15 μm by an exposure and development process.

As described with FIG. 19B, by using the pattern 303a as a mask, the conductive film 302 is patterned. In etching this conductive film 302, isotropic etching is performed using ammonium cerium (IV) nitrate. As described with FIG. 19C, by using the pattern 303a as a mask, the insulating film 301 is patterned. In etching this insulating film 301, anisotropic etching is performed using low pressure plasma ashing at a pressure of 1 Pa or lower. As described with FIG. 19D, the substrate is heated to fluidize the pattern 303a to form the cover film 303. The substrate temperature is set to 200° C. Thereafter, the vertical alignment film is formed over the whole substrate surface. The width of the bottom of the protrusion 323 shown in FIG. 20 is about 10 μm and the pitch of protrusions is 100 μm.

Since the protrusion 323 formed by the above processes includes the conductive film 302, light incident upon the protrusion 323 can be shielded so that leak light to be caused by disturbed alignment of liquid crystal molecules can be avoided.

The protrusion 323 formed by the above processes can be used as a repair wiring line when a drain bus line is disconnected. Consider now that one drain bus line 332 is broken at a disconnection point 320 as shown in FIG. 20. In order to electrically separate a portion 322 of the protrusion 323 overriding the disconnection point 320 from the other portion of the protrusion 323, the protrusion 323 is cut with a laser beam at cut points 324 and 325.

Figure 21:
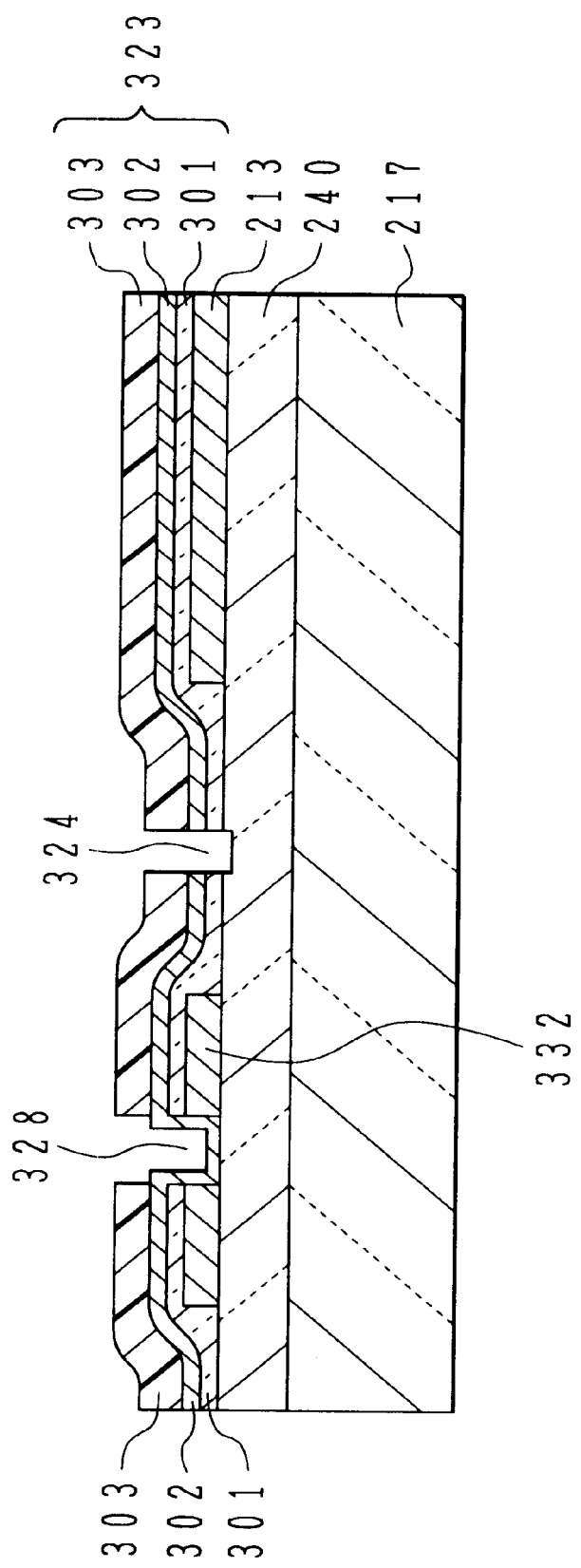
FIG. 21 is a cross sectional view of a cut point and a bonding point of a protrusion which repairs disconnected drain bus lines.

The portion 322 of the separated protrusion is bonded to the disconnected drain bus lines 332 at bonding points 328 and 329 to electrically connect the separated protrusion and disconnected bus lines 332. The disconnected drain bus lines 332 are therefore electrically connected together via the portion 322 of the protrusion 323. FIG. 21 is a cross sectional view of the cut point 324 and bonding point 328. The disconnected drain bus lines 332 can therefore by repaired.

Next, with reference to FIG. 22, the eleventh embodiment will be described.

Figure 22:
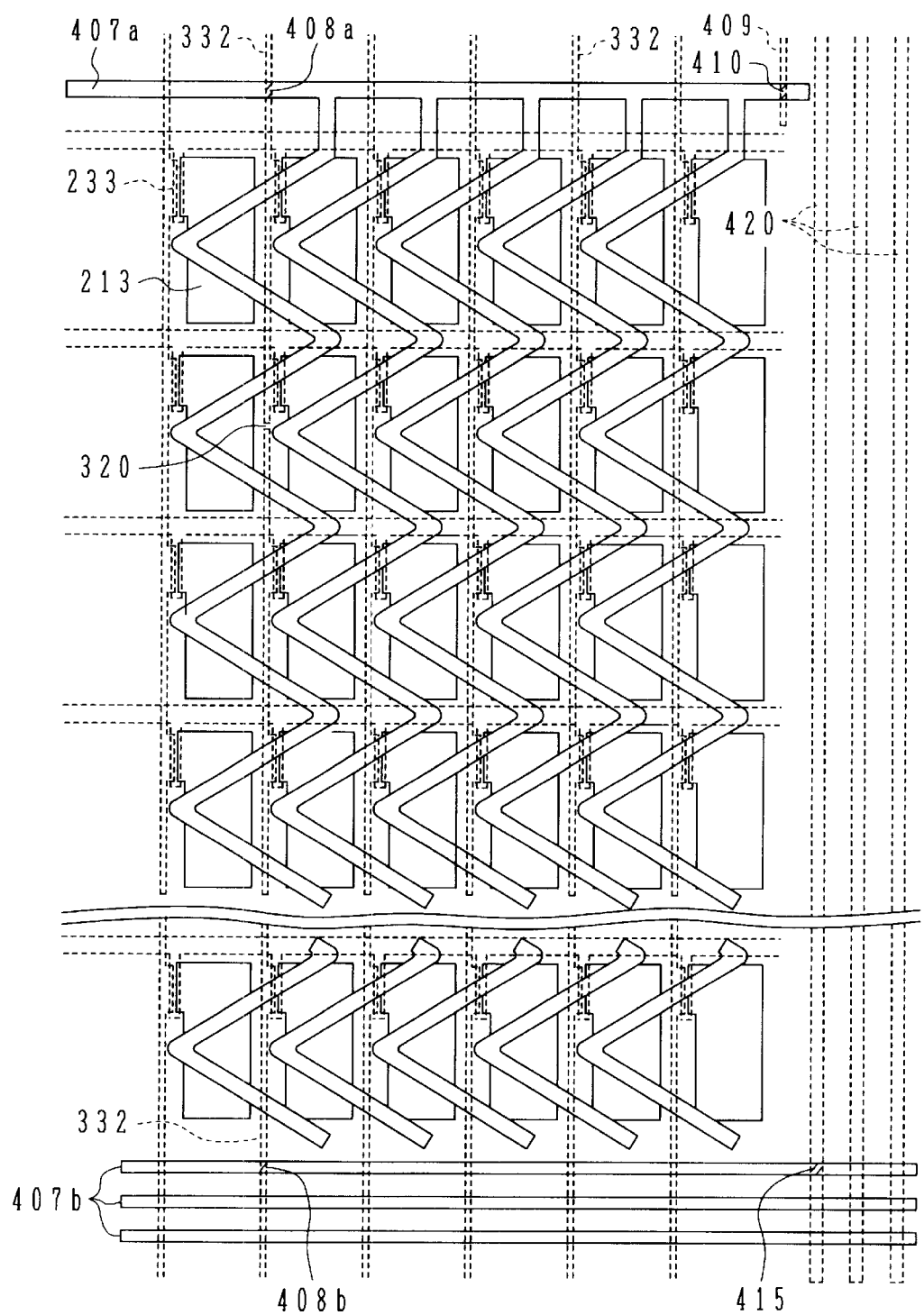
FIG. 22 is a plan view of a liquid crystal display device according to a twelfth embodiment of the invention.

FIG. 22 is a plan view of the TFT substrate of a liquid crystal display device of the eleventh embodiment. Repair lines 407a and 407b are formed in upper and lower areas in FIG. 22 of output leads of drain bus lines 332. The repair lines 407a and 407b extend crossing the output leads of the drain bus lines 332. Each of the repair lines 407a and 407b has the cross sectional structure similar to that of the protrusion 220B shown in FIG. 18.

Consider now that one drain bus lines 332 is broken at a disconnection point 320. At a cross point 408a between the output lead of the disconnected drain bus line 332 and repair line 407a, they are bonded with a laser beam, and at a cross point 408b between the output lead of the disconnected drain bus line 332 and the repair line 407b, they are bonded with a laser beam. An output electrode 409 is disposed crossing the repair line 407a. At a cross point 410 between the repair line 407a and output electrode 409, they are bonded with a laser beam.

Output electrodes 420 cross the repair lines 407b. The output electrodes 420 are formed by the same process as the process for the drain bus lines 332. At a cross point between the repair line 407b connected to the disconnected drain bus line 332 and the output electrode 420, they are bonded with a laser beam. The output electrodes 409 and 420 connected to the disconnected drain bus lines 332 are electrically connected by an external wiring line so that the disconnection of the drain bus line 332 can be repaired.

Next, with reference to FIG. 23, the thirteenth embodiment will be described. In the thirteenth embodiment, the protrusion is used as the electrode of an auxiliary capacitance.

Figure 23:
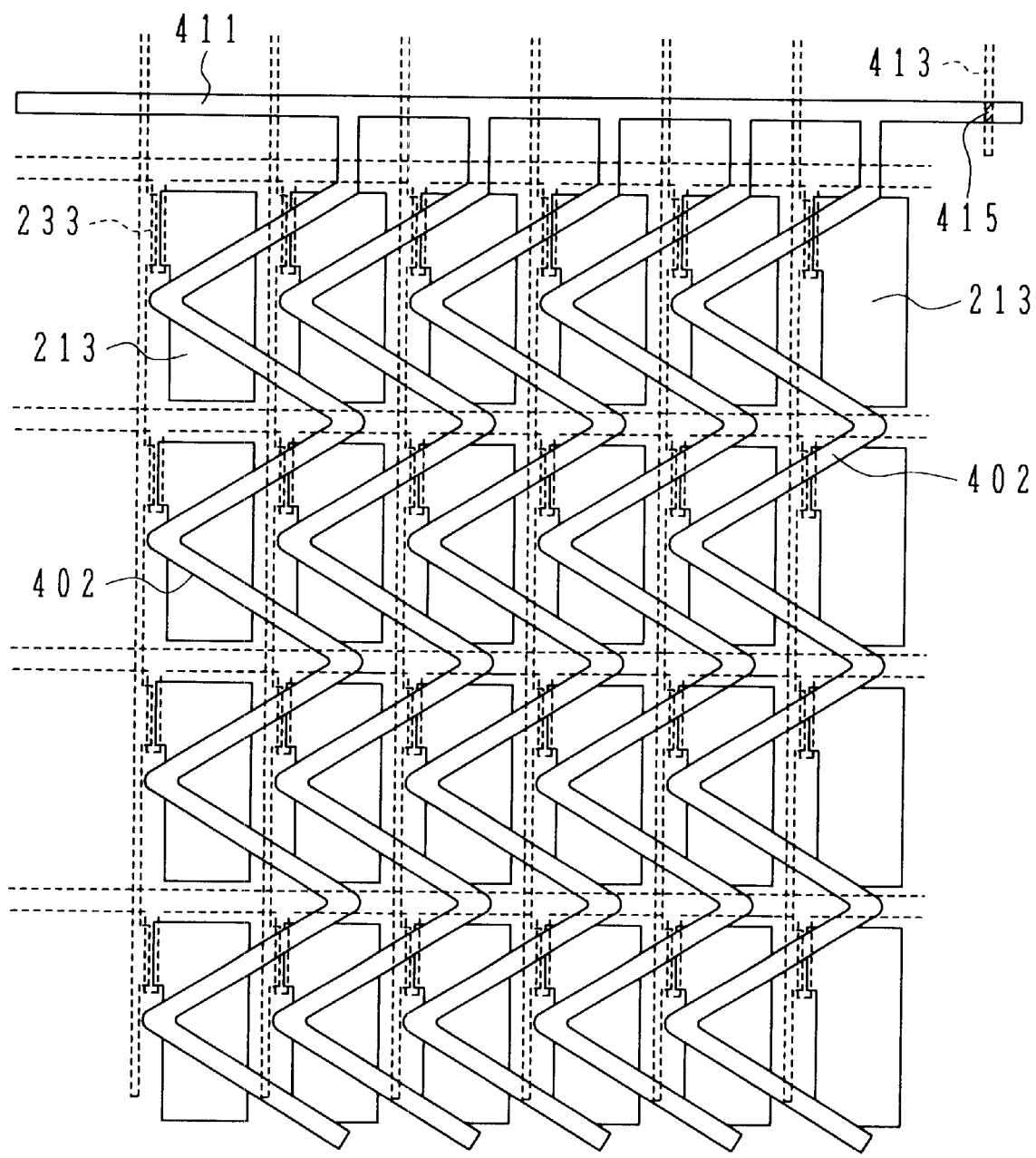
FIG. 23 is a plan view of a liquid crystal display device according to a thirteenth embodiment of the invention.

FIG. 23 is a plan view of the TFT substrate of a liquid crystal display device of the thirteenth embodiment. In the upper peripheral area shown in FIG. 23, common lines are disposed extending in the lateral direction. The common line 411 is formed at the same time when protrusions 402 are formed and is continuous with the protrusions 402. An output electrode 413 crosses the common line 411 at a cross point 415. At this cross point, the common line 411 is bonded to the output electrode 413 with a laser beam.

An auxiliary capacitance is formed in the area of the protrusion 402 where the pixel electrode 213 is superposed. With this structure, it is not necessary to dispose the capacitance bus line 235 such as shown in FIG. 17, so that the aperture efficiency can be improved.

As a bias voltage (offset voltage) is applied to the common line 411, tilts of liquid crystal molecules near the protrusion 402 can be made similar to those of liquid crystal molecules in other areas. Namely, the tilts can be set near perpendicular to the substrate surface. According to experiments, the contrast 300 of a liquid crystal display device having capacitance bus lines was able to be improved to 350 or higher.

In the eleventh to thirteenth embodiments, the protrusion is used either as the repair wiring line for a disconnected drain bus or as the electrode of the auxiliary capacitance. The protrusion maybe used as both the repair wiring line and the electrode of the auxiliary capacitance. The protrusion may be used as the repair line of not only the drain bus line but also the gate bus line.

Next, with reference to FIGS. 24A and 24B, the fourteenth embodiment will be described. In the liquid crystal display device of the fourteenth embodiment, a so-called gate connection type is adopted wherein the gate bus line of TFT in one row is connected to the drain region of TFT at an adjacent row.

Figure 24A:
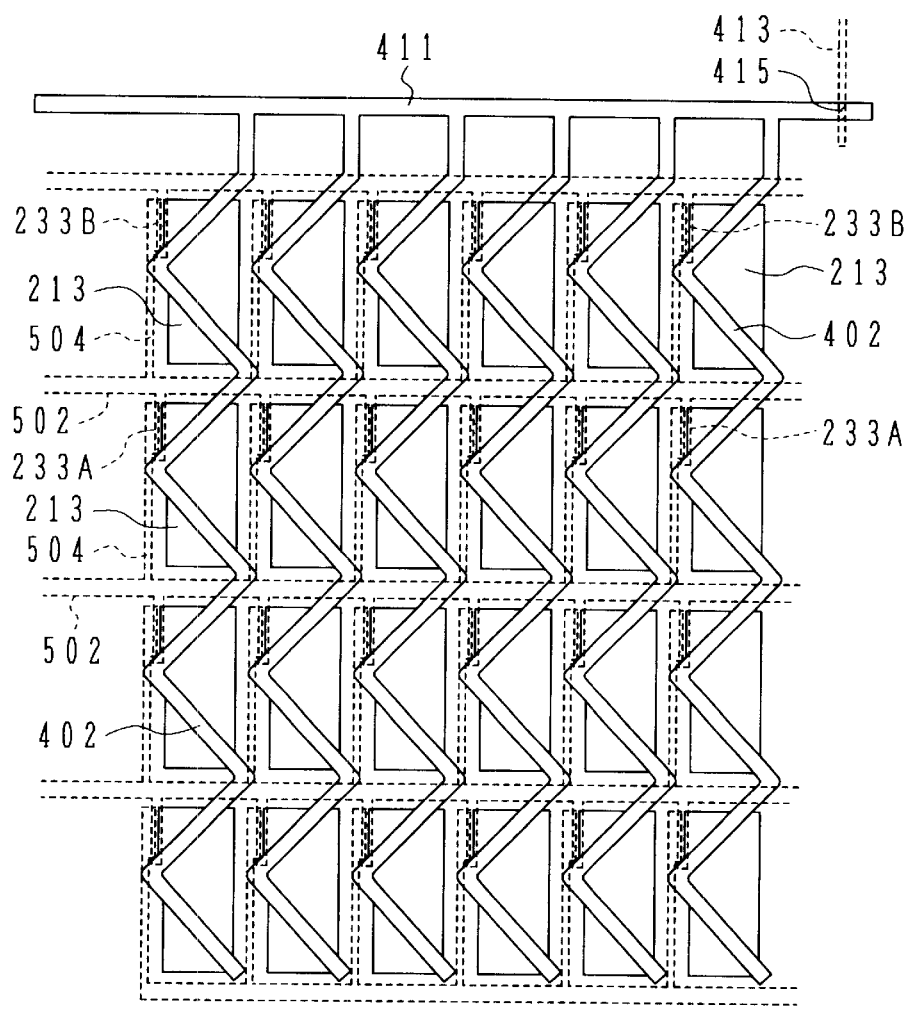
FIG. 24 is a plan view of a liquid crystal display device according to a fourteenth embodiment of the invention.
Figure 24B:
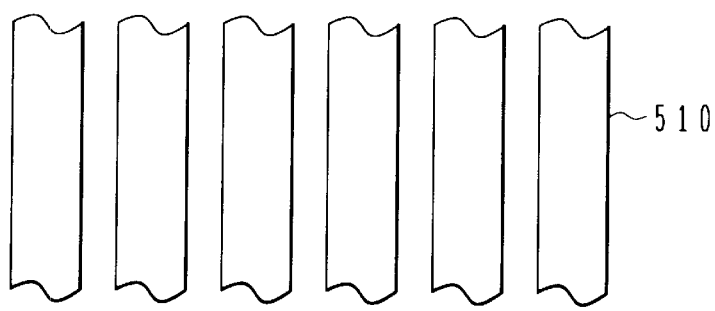
Figure 25A:
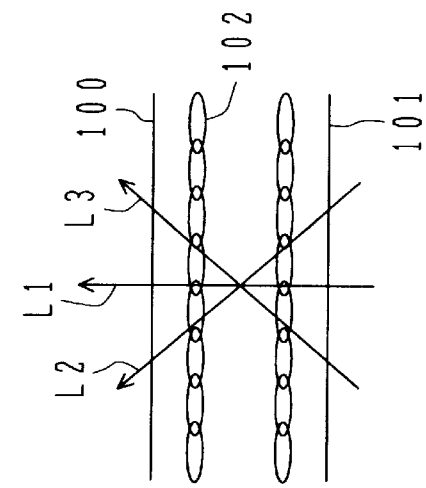
FIGS. 25A to 25C are schematic cross sectional views of a conventional homeotropic type liquid crystal display device, illustrating the visual angle characteristics of the device.
Figure 25B:
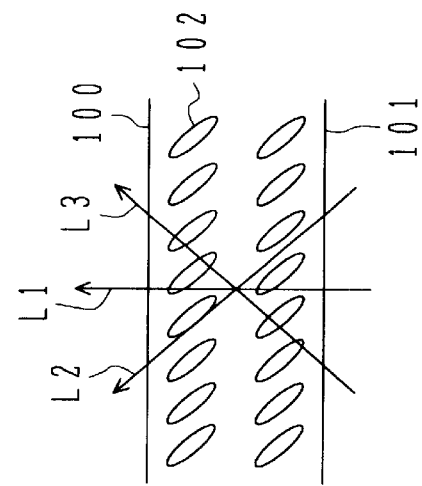
Figure 25C:
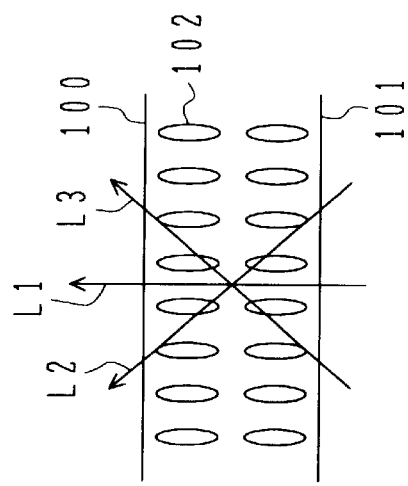

FIG. 24A is a plan view of the TFT substrate of a liquid crystal display device of the fourteenth embodiment. The gate bus line 502 of TFT 233a at one row is connected to the drain region of TFT 233B at an adjacent row (a row upper by one row in FIG. 24A). Scanning is executed by sequentially applying a voltage to the gate bus lines 502.

In a usual active matrix type liquid crystal display device, the opposing electrode is made of a single conductive film formed over the whole substrate surface. In the gate connection type liquid crystal display device, as shown in FIG. 24B, the opposing electrodes 510 have a stripe pattern such as that of the electrodes of a simple matrix type liquid crystal display device. The opposing electrodes 510 are provided one electrode per one pixel electrode column of the TFT substrate. By using this stripe pattern, a signal is applied to each pixel electrode. The TFT substrate of a gate connection type can be formed by using the number of masks smaller than that for a usual TFT substrate.

Similar to the thirteenth embodiment, a common line 411 and an output electrode 413 are provided and they are bonded at a cross point 415 to add the auxiliary capacitance to each pixel electrode 213.

The present invention has been described in connection with the preferred embodiments. The invention is not limited only to the above embodiments. It is apparent that various modifications, improvements, combinations, and the like can be made by those skilled in the art.

What is claimed is:

1. A liquid crystal display device, comprising:

first and second substrates disposed in parallel at a gap therebetween;

liquid crystal material containing liquid crystal molecules having negative dielectric anisotropy, said liquid crystal material being filled in the gap between said first and second substrates;

alignment film for homeotropically aligning the liquid crystal molecules in a state of no electric field;

pixel electrodes formed on an opposing surface of said first substrate and regularly disposed in row and column directions;

a common electrode formed on an opposing surface of said second substrate;

data bus lines disposed on the opposing surface of said first substrate, each data bus line being provided in correspondence with each column of said pixel electrodes;

gate bus lines disposed on the opposing surface of said first substrate, each gate bus line being provided in correspondence with each row of said pixel electrodes, said gate bus line being disposed passing an inside area of said pixel electrode at a corresponding row, as viewed along a substrate normal direction;

switching elements disposed on the opposing surface of said first substrate, each switching element being provided in correspondence with each pixel electrode, each switching element connecting a corresponding pixel electrode and a corresponding data bus line and being switched between a conduction state and a non-conduction state in response to an externally applied control signal;

gate connection lines, each gate connection line being provided for each switching element, each gate connection line transferring the control signal from the gate bus line, corresponding to a row different from a row of the pixel electrode connected to corresponding switching element, to corresponding switching element;

protrusions formed on the opposing surface of one of said first and second substrates, said protrusions dividing an area of said pixel electrode into a plurality of areas and each protrusion being bent at a point where the protrusion intersects with the gate bus line as viewed along the substrate normal direction; and domain border regulating structure formed on the opposing surface of the other of said first and second substrates, said domain border regulating structure being disposed at a distance from each of said protrusions as viewed along the substrate normal direction, said domain border regulating structure defining, together with said protrusions, borders of each domain in which a tilt direction of the liquid crystal molecules is uniform when a voltage is applied across said pixel electrode and said common electrode.

2. A liquid crystal display device according to claim 1, wherein said domain border regulating structure comprises other protrusions formed on the opposing surface of one of said first and second substrates not formed with said protrusions.

3. A liquid crystal display device according to claim 1, wherein said domain border regulating structure comprises slits formed in said pixel electrodes.

4. A liquid crystal display device according to claim 1, wherein said gate connection line branches from said gate bus line, extends along a side of said pixel electrode a row corresponding to said gate bus line, and transfers the control signal to said switching element connected to said pixel electrode at a row adjacent to a row corresponding to said gate bus line.

5. A liquid crystal display device according to claim 3, wherein said gate connection line overlaps with each of said slits as viewed along the substrate normal direction.

6. A liquid crystal display device according to claim 1, wherein said protrusion is disposed along a straight line obliquely crossing said gate bus line in an area between said gate bus lines and bent at a point where the protrusion intersects with the gate but line as viewed along the substrate normal direction.

7. A liquid crystal display device according to claim 1, further comprising other slits formed in said pixel electrodes, said other slits each being disposed inclusive of a portion of said protrusion in a longitudinal direction.

8. A liquid crystal display device, comprising:

first and second substrates disposed in parallel at a gap therebetween;

liquid crystal material containing liquid crystal molecules having negative dielectric anisotropy, said liquid crystal material being filled in the gap between said first and second substrates;

alignment film for homeotropically aligning the liquid crystal molecules in a state of no electric field;

pixel electrodes formed on an opposing surface of said first substrate and regularly disposed in row and column directions;

a common electrode formed on an opposing surface of said second substrate;

data bus lines disposed on the opposing surface of said first substrate, each data bus line being provided in correspondence with each column of said pixel electrodes;

gate bus lines disposed on the opposing surface of said first substrate, each gate bus line being provided in correspondence with each row of said pixel electrodes;

switching elements disposed on the opposing surface of said first substrate, each switching element being provided in correspondence with each pixel electrode, each switching element connecting a corresponding pixel electrode to a corresponding data bus line and being switched between a conduction state and a non-conduction state in response to a control signal applied to said gate bus line;

first protrusions formed on the opposing surface of said first substrate, each first protrusion dividing an area of said pixel electrode into a plurality of areas as viewed along the substrate normal direction;

second protrusions formed on the opposing surface of said second substrate, each second protrusion being disposed at a distance from the first protrusion as viewed along the substrate normal direction; and slits formed in said pixel electrodes and each being disposed inclusive of a portion of said first protrusion in a longitudinal direction.

9. A liquid crystal display device, comprising:

first and second substrates disposed in parallel at a gap therebetween;

switching elements disposed on an opposing surface of said first substrate in a matrix form;

pixel electrodes, each being provided in correspondence with each of said switching elements;

gate bus lines disposed on the opposing surface of said first substrate;

drain bus lines disposed on the opposing surface of said first substrate;

an opposing electrode formed on an opposing surface of said second substrate;

protrusions formed on the opposing surface of at least one of said first and second substrates, defining domain borders of each pixel and including a conductive film covered with insulating material; and liquid crystal material filled in that gap between said first and second substrates, wherein said switching element connects the pixel electrode to a corresponding drain bus line and a conduction state of the switching element is controlled in response to a signal applied to a corresponding gate bus line.

10. A liquid crystal display device according to claim 9, wherein said liquid crystal material contains liquid crystal molecules having negative dielectric anisotropy, the liquid crystal display device further comprises an alignment film for vertically align the liquid crystal molecules on the opposing surface of at least one of said first and second substrates.

11. A liquid crystal display device according to claim 9, wherein said protrusions each have a surface slanted relative to a substrate surface.

12. A liquid crystal display device according to claim 9, wherein said protrusions each include an underlying insulating film made of insulating material, a conductive film formed on the underlying insulating film, and a cover film made of insulating material and covering the conductive film, and wherein the cover film is made of organic material having a melting point or softening point lower than that of the underlying insulating film.

13. A liquid crystal display device according to claim 12, wherein the cover film is made of photosensitive organic material.

14. A liquid crystal display device according to claim 9, wherein protrusions each are used as a repair wiring line for a disconnection point of said gate bus line or said drain bus line.

15. A liquid crystal display device according to claim 9, wherein said protrusions are formed on the opposing surface of said first substrate, the liquid crystal display device further comprises a repair line formed on the opposing surface of said first substrate in a peripheral area of an area where said pixel electrodes are disposed, said repair line having a cross sectional structure same as that of said protrusions and crossing said gate bus line or said drain bus line, and a disconnected line of said gate bus line or said drain bus line is electrically connected to said repair line at a cross point.

16. A liquid crystal display device according to claim 9, wherein said protrusions are formed on the opposing surface of said first substrate, the liquid crystal display device further comprises a common line formed on the opposing surface of said first substrate in a peripheral area of an area where said pixel electrodes are disposed, said common line having a cross sectional structure same as that of said protrusions and connected to each of said protrusions and forming an auxiliary capacitance that is defined by each of said pixel electrodes and a portion of the conductive film of said protrusion where the portion overlaps said pixel electrode.

17. A liquid crystal display device according to claim 16, wherein an output line for applying a bias voltage is connected to the conductive film in said common line.

18. A liquid crystal display device according to claim 9, wherein each of said gate bus lines serves as said drain bus line connected to said switching element at a row adjacent to a row of said switching element corresponding to said gate bus line, and said opposing electrode has a stripe pattern disposed for each column of said pixel electrodes.

* * * * *